United States Patent
Muta et al.

(10) Patent No.: US 11,466,481 B2
(45) Date of Patent: Oct. 11, 2022

(54) VEHICLE DOOR ASSEMBLY

(71) Applicant: Nissan North America, Inc., Franklin, TN (US)

(72) Inventors: Yoshio Muta, Novi, MI (US); David Kovie, Livonia, MI (US); Richard Dryja, Canton, MI (US); Mahiuddin Ahmed, Troy, MI (US)

(73) Assignee: NISSAN NORTH AMERICA, INC., Franklin, TN (US)

(*) Notice: Subject to any disclaimer, the term of this patent is extended or adjusted under 35 U.S.C. 154(b) by 629 days.

(21) Appl. No.: 16/264,952

(22) Filed: Feb. 1, 2019

(65) Prior Publication Data

US 2020/0248488 A1 Aug. 6, 2020

(51) Int. Cl.
*E05B 79/06* (2014.01)
*B60J 5/04* (2006.01)
(Continued)

(52) U.S. Cl.
CPC ............ *E05B 79/06* (2013.01); *B60J 5/0413* (2013.01); *B60J 5/0415* (2013.01); *B60J 5/0416* (2013.01);
(Continued)

(58) Field of Classification Search
CPC . E05B 79/06; E05B 77/36; B60J 5/042; B60J 5/0423; B60J 5/0434; B60J 5/0451
See application file for complete search history.

(56) References Cited

U.S. PATENT DOCUMENTS

| | | | | |
|---|---|---|---|---|
| 4,800,638 A | * | 1/1989 | Herringshaw | B60J 5/0416 29/407.1 |
| 6,019,418 A | * | 2/2000 | Emerling | B60J 5/0416 296/146.7 |

(Continued)

FOREIGN PATENT DOCUMENTS

| | | | |
|---|---|---|---|
| DE | 102008011754 A1 | 9/2009 | |
| EP | 1544011 A1 * | 6/2005 | ............ B60J 5/0426 |

(Continued)

OTHER PUBLICATIONS

Machine translation of FR2980404A1.*
Machine_translation_of_EP1544044A1.pdf.*
Photograph of vehicle Alliance Internal, Jan. 2019.

*Primary Examiner* — Marcus Menezes
(74) *Attorney, Agent, or Firm* — Global IP Counselors, LLP

(57) ABSTRACT

An outer door panel and an inner door panel are fixed to one another defining a cavity therebetween. A door handle assembly is fixedly attached to the outer door panel, with at least a portion of the door handle assembly overlaying an inboard surface of the outer door panel within the cavity. An inboard portion of the door handle assembly has a connection structure. An upwardly extending bracket within the cavity is fixed to an upper end and a lower end of at least one of the inner door panel or the outer door panel. The upwardly extending bracket is spaced apart from the door handle assembly. A vibration absorbing member has a first end fixed to the connection structure of the door handle assembly and a second end attached to the upwardly extending bracket at a location spaced apart from upper and lower ends of the upwardly extending bracket.

17 Claims, 17 Drawing Sheets

(51) Int. Cl.
  *E05B 77/02*       (2014.01)
  *E05B 85/16*       (2014.01)
  *E05B 77/36*       (2014.01)
(52) U.S. Cl.
  CPC .............. *E05B 77/02* (2013.01); *E05B 77/36* (2013.01); *E05B 85/16* (2013.01); *E05Y 2900/531* (2013.01)

(56) References Cited

U.S. PATENT DOCUMENTS

| | | | | |
|---|---|---|---|---|
| 6,447,047 | B1 * | 9/2002 | Marcovecchio | .... B60R 13/0243 296/146.6 |
| 7,568,744 | B2 | 8/2009 | Tanorio et al. | |
| 7,971,927 | B2 * | 7/2011 | Tomasu | .............. B60R 21/0428 296/187.12 |
| 8,328,250 | B2 * | 12/2012 | Botten | .................... E05B 85/16 292/336.3 |
| 9,688,123 | B2 * | 6/2017 | Hasegawa | .............. B60J 5/0451 |
| 10,094,151 | B2 * | 10/2018 | Yoshino | .................. E05B 79/06 |
| 10,730,468 | B2 * | 8/2020 | Yamamoto | .......... B60R 21/0428 |
| 10,864,805 | B2 * | 12/2020 | Kovie | .................... B60J 5/0452 |
| 2001/0017476 | A1 * | 8/2001 | Nishikawa | ............. B60J 5/0451 296/146.6 |
| 2007/0069532 | A1 | 3/2007 | Tanorio et al. | |
| 2008/0246309 | A1 | 10/2008 | Abe | |
| 2010/0109379 | A1 | 5/2010 | Abe | |
| 2011/0169302 | A1 * | 7/2011 | Deng | ....................... B60J 5/042 296/187.12 |
| 2012/0152674 | A1 * | 6/2012 | Fukuo | .................... F16F 7/121 188/377 |
| 2014/0049058 | A1 * | 2/2014 | Kudoh | .................... E05B 79/06 292/336.3 |
| 2015/0115585 | A1 * | 4/2015 | Smith | ................. B60R 13/0243 280/751 |
| 2015/0224858 | A1 * | 8/2015 | Yoshimoto | ............. B60J 5/0434 292/336.3 |
| 2017/0240031 | A1 * | 8/2017 | Moriyama | ............. B60J 5/0466 |
| 2018/0066459 | A1 * | 3/2018 | Beck | ....................... E05B 79/06 |
| 2020/0384833 | A1 * | 12/2020 | Martino | ................. B60J 5/0413 |

FOREIGN PATENT DOCUMENTS

| | | | | |
|---|---|---|---|---|
| FR | 2980404 | A1 * | 3/2013 | ............. E05B 77/04 |
| RU | 180276 | U1 | 6/2018 | |
| WO | WO-2017187037 | A1 * | 11/2017 | ............ B60J 5/0443 |

* cited by examiner

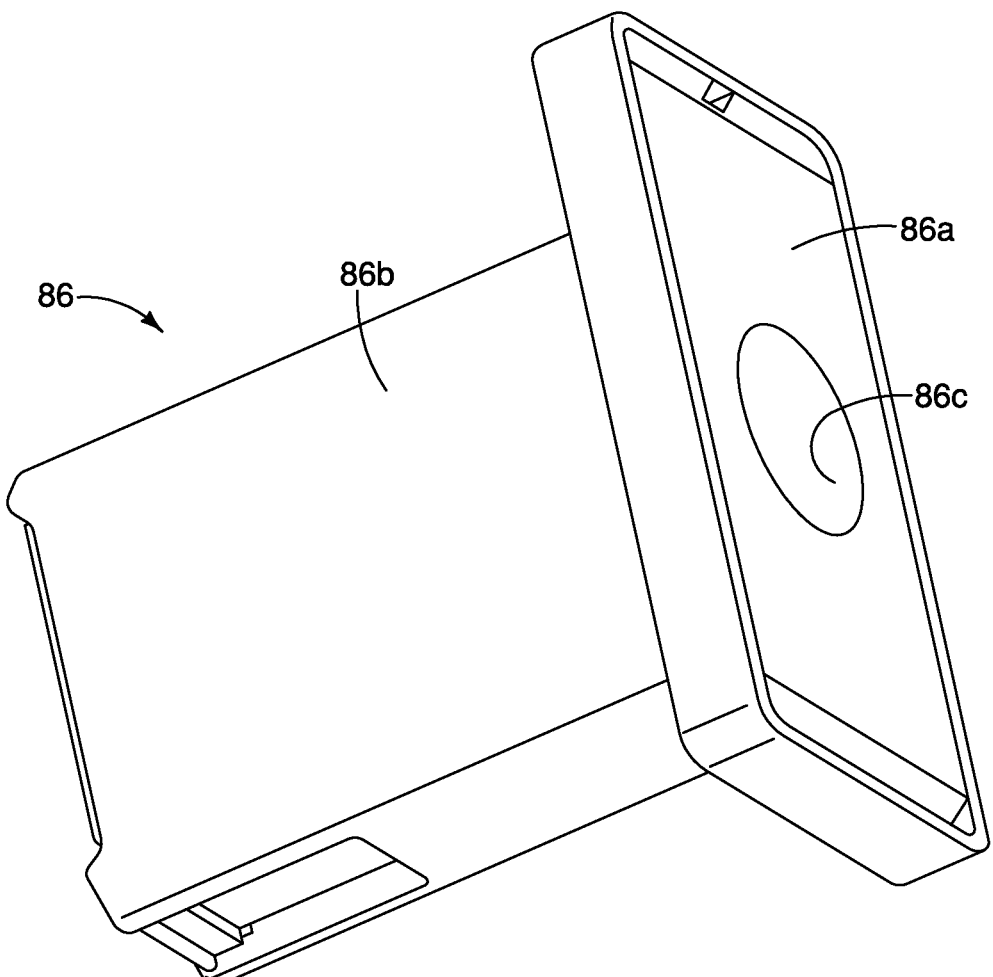
FIG. 34
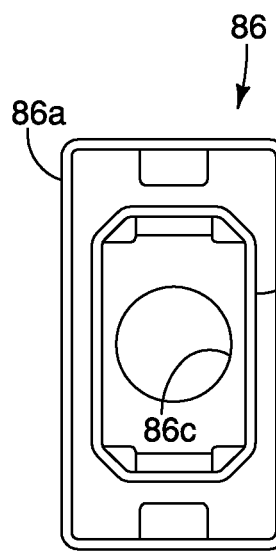 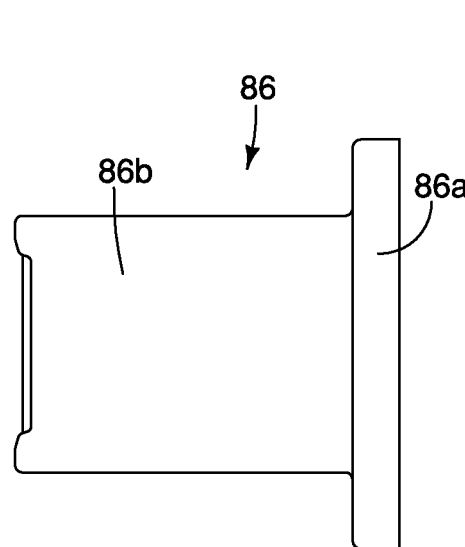 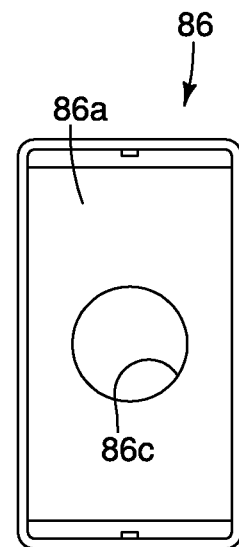
FIG. 35　　FIG. 36　　FIG. 37

VEHICLE DOOR ASSEMBLY

BACKGROUND

Field of the Invention

The present invention generally relates to a vehicle door assembly. More specifically, the present invention relates to vehicle door assembly that includes structural elements and a door handle assembly configured to absorb impact forces during a side impact event and distribute those impact forces to predetermined areas of the vehicle door assembly.

Background Information

Vehicles are continuously being tested in conditions where impact forces during a side impact event are directly applied to a vehicle door assembly.

SUMMARY

One object of the present disclosure is to provide features to a vehicle door assembly such that in response a side impact event where impact forces act on the vehicle door assembly, the impact forces are distributed to predetermined areas of the vehicle door assembly.

Another object of the present disclosure is to provide a vehicle door assembly with features such that in response to a side impact event, the moving parts of the door handle assembly are at least partially covered reducing possibility of movement of those moving parts.

In view of the state of the known technology, one aspect of the present disclosure is to provide a vehicle door assembly with an outer door panel, and inner door panel, a door handle assembly, an upwardly extending bracket and a vibration absorbing member. The outer door panel has an inboard surface and an outboard surface with a first handle opening that extends from the inboard surface to the outboard surface. The inner door panel has an outer periphery fixed to a corresponding outer periphery of the outer door panel defining a cavity therebetween. The door handle assembly is fixedly attached to the outer door panel, with at least a portion of the door handle assembly overlaying the inboard surface of the outer door panel within the cavity. An inboard portion of the door handle assembly has a connection structure. The upwardly extending bracket is located within the cavity. The upwardly extending bracket is fixed to an upper end and a lower portion of at least one of the inner door panel or the outer door panel, the upwardly extending bracket is spaced apart from the door handle assembly. The vibration absorbing member has a first end fixed to the connection structure of the door handle assembly and a second end attached to the upwardly extending bracket at a location spaced apart from upper and lower ends of the upwardly extending bracket.

BRIEF DESCRIPTION OF THE DRAWINGS

Referring now to the attached drawings which form a part of this original disclosure:

FIG. 34 is a perspective view of the first fastener removed form the door handle assembly showing a head portion and a shank portion in accordance with the first embodiment;

FIG. 35 is an end view of the first fastener showing an inboard end of the shank portion of the first fastener in accordance with the first embodiment;

FIG. 36 is a side view of the first fastener showing the shank portion and the head portion in accordance with the first embodiment;

FIG. 37 is another end view of the first fastener showing the head portion in accordance with the first embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
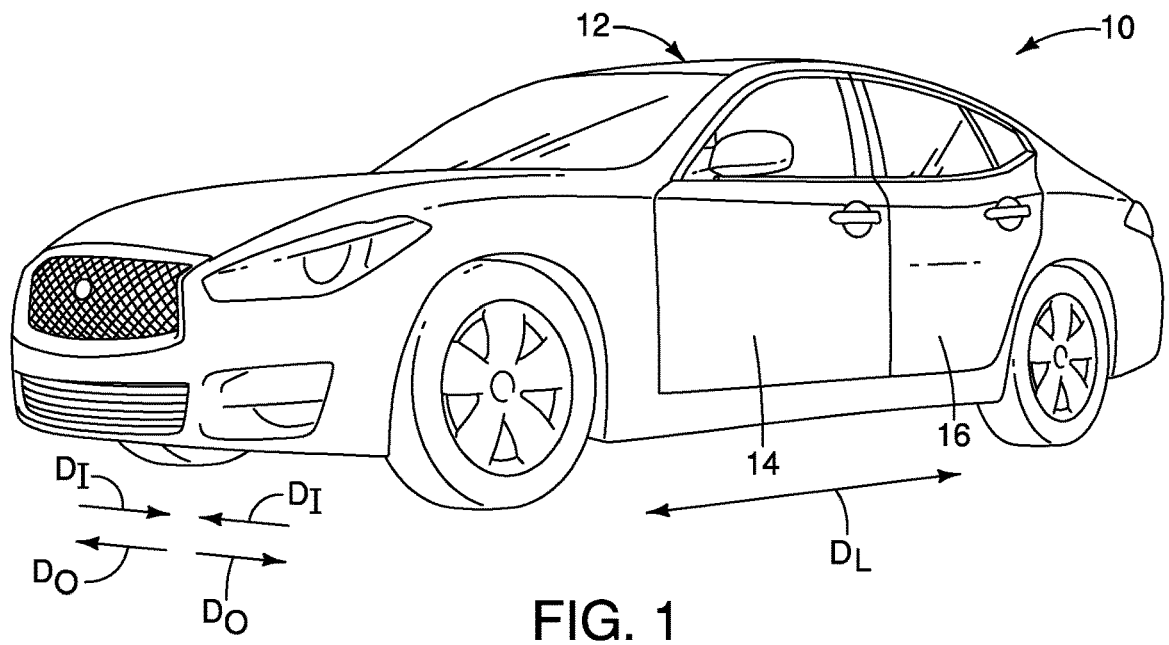
FIG. 1 is a perspective view of a vehicle that includes a rear door with support structures and a door handle assembly in accordance with a first embodiment.

Referring initially to FIG. 1, a vehicle 10 is illustrated in accordance with a first embodiment. The vehicle 10 includes a vehicle body structure 12 with front doors 14 and rear doors 16.

As shown in FIG. 1, a plurality of differing directions is defined relative to the vehicle 10. Those directions include: a vehicle longitudinal direction DL; a vehicle inboard direction Di; and a vehicle outboard direction Do. The vehicle inboard direction Di and the vehicle outboard direction Do are defined relative to an imaginary center line of the vehicle 10, where the imaginary center line extends in the vehicle longitudinal direction DL of the vehicle 10. Reference to inboard and outboard directions in the following description are with respect to the above listed vehicle directions.

The vehicle 10 is depicted as a four dour sedan. However, the vehicle 10 can be any of a variety of vehicle designs, such as a crew cab pickup truck, an SUV (sports utility vehicle) or other four door vehicle design.

Figure 2:
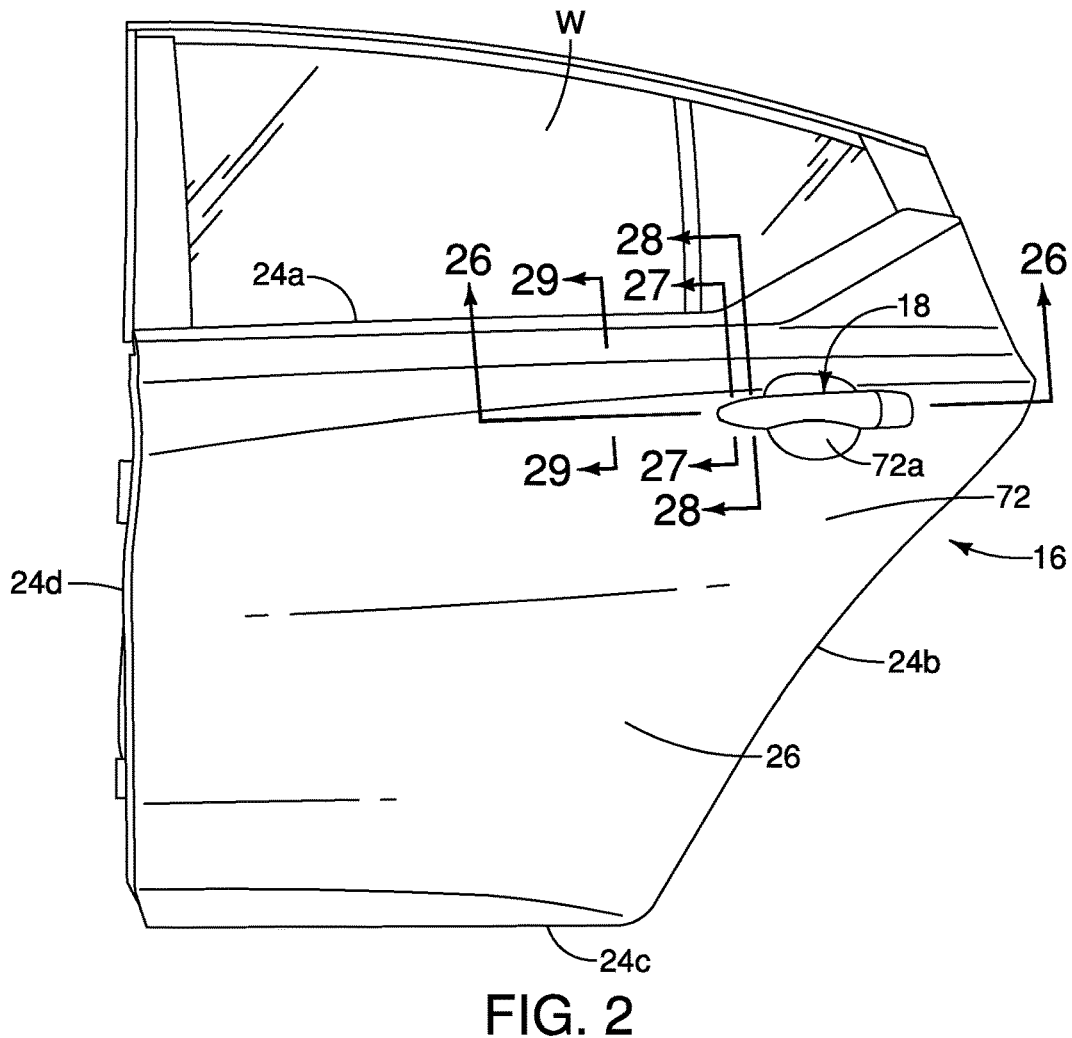
FIG. 2 is a side view of the rear door removed from the vehicle showing portions of the door handle assembly in accordance with the first embodiment.

One of the rear doors 16 is shown removed from the vehicle 10 in FIG. 2. For the sake of brevity, only one of the rear doors 16 is described herein below. However, the description below of features of the rear door 16 applies equally to both rear doors 16.

The rear door 16 (also referred to as a vehicle door assembly) has a door handle assembly 18 that is manually operated to open the rear door 16 from outside the vehicle 10 in a conventional manner. A detailed description of door handle assembly 18 is provided below.

Figure 3:
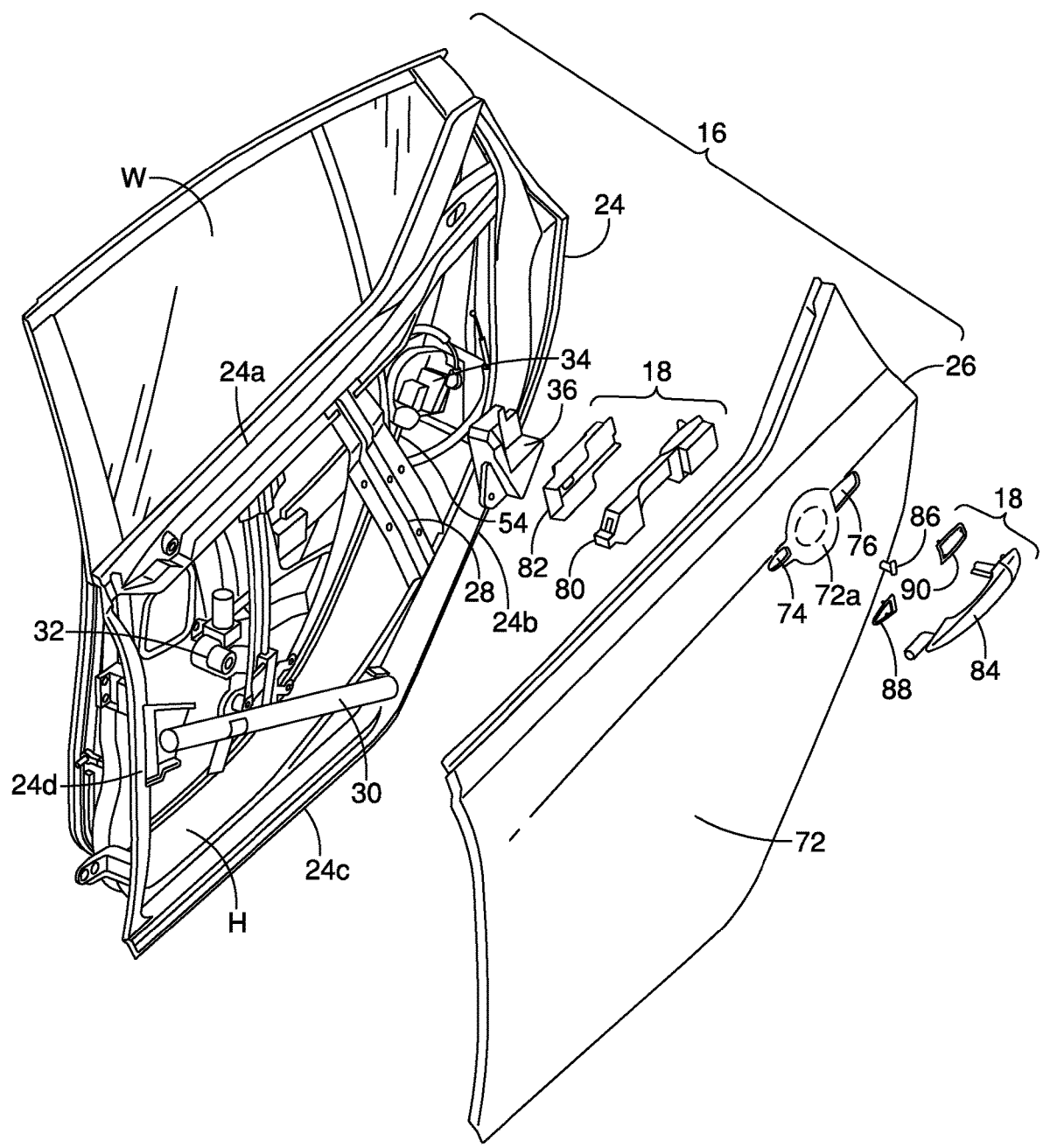
FIG. 3 is an exploded perspective view of the rear door showing an inner door panel, an outer door panel, elements of the door handle assembly, a vibration absorbing member, and a reinforcement beam in accordance with the first embodiment.

As shown in FIG. 3, the rear door 16 includes an inner door panel 24, an outer door panel 26, a first reinforcement beam 28, a second reinforcement beam 30, a window supporting mechanism 32, a latch mechanism 34, a vibration absorbing member 36 and the door handle assembly 18.

Figure 4:
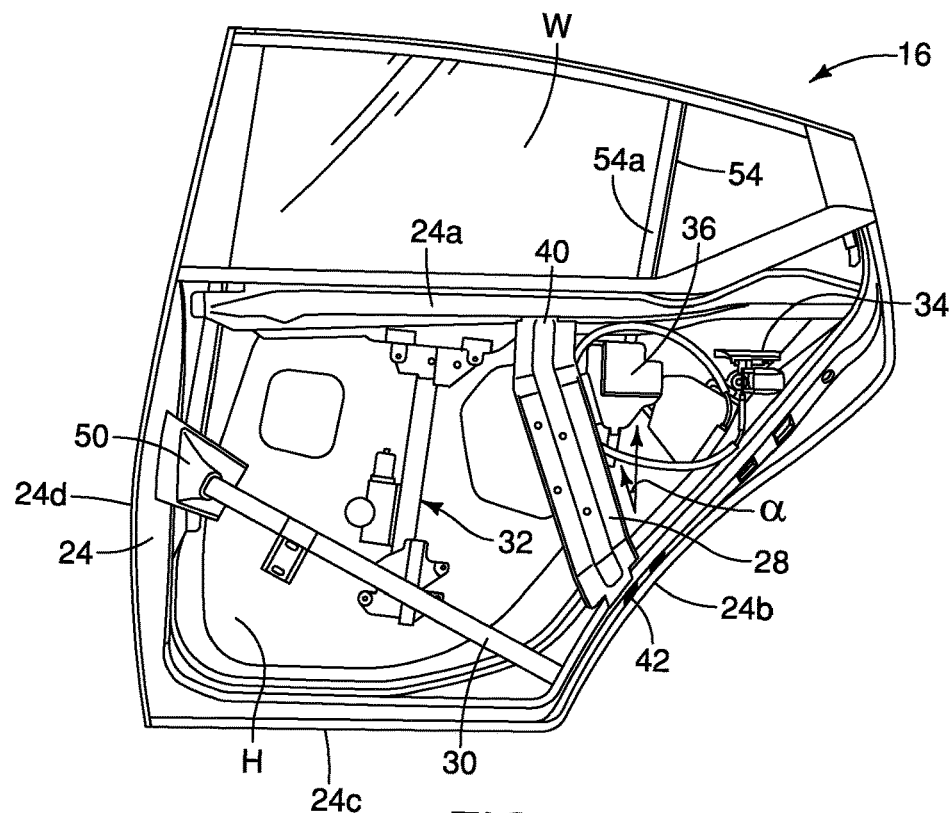
FIG. 4 is a side view of the rear door with the outer door panel removed showing a door latch mechanism, a window supporting mechanism, the vibration absorbing member and the reinforcement beam in accordance with the first embodiment.
Figure 5:
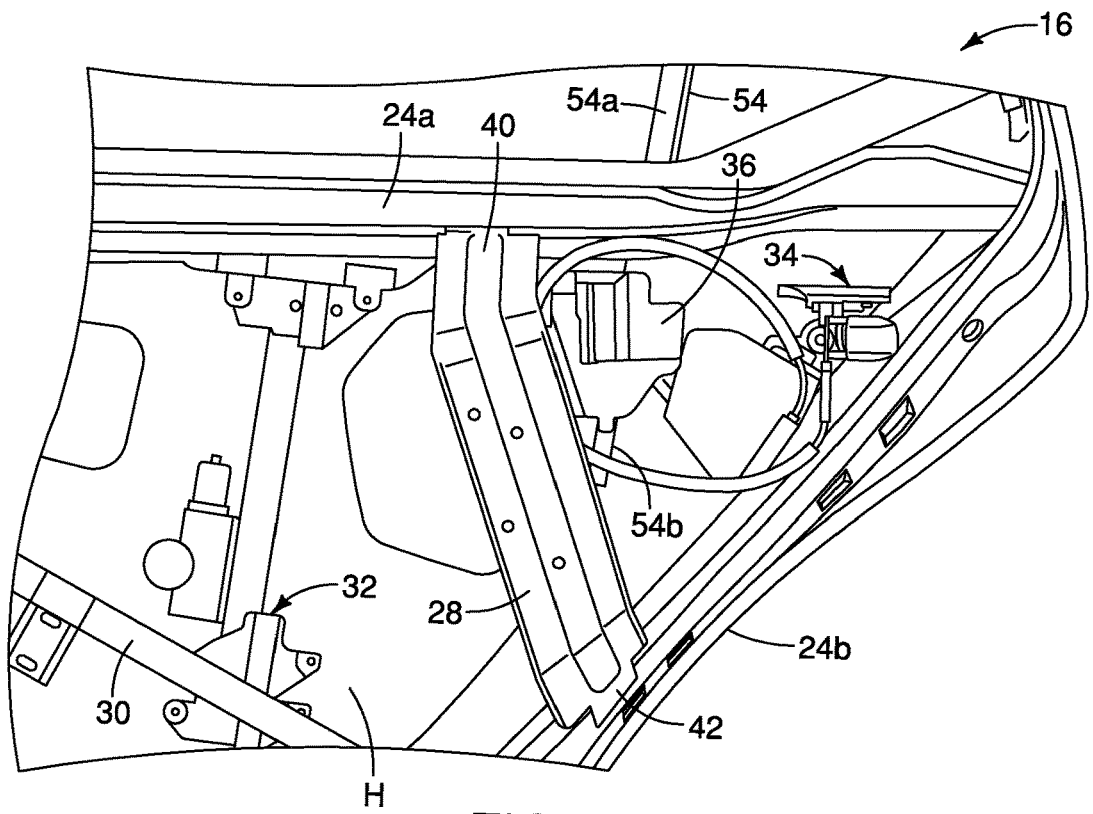
FIG. 5 is another side view of the rear door with the outer door panel removed showing further details of the door latch mechanism, the window supporting mechanism, the vibration absorbing member and the reinforcement beam in accordance with the first embodiment.

As shown in FIGS. 3, 4 and 5, the inner door panel 24 defines a hollow recessed area or cavity H that is concealed with the outer door panel 26 attached to the inner door panel 24 and the door 16 fully assembled. In the depicted embodiment, the door 16, and in particular, the inner door panel 24 has an upper edge 24a, a rearward edge 24b, a bottom edge 24c and a forward edge 24d. It should be understood from the drawings and the description herein that the inner door panel 24 and the outer door panel 26 are rigidly fixed to one another in a conventional manner. For example, an outer periphery of the inner door panel 24 can fixed to a corresponding outer periphery of the outer door panel 26 via any of a variety of welding techniques. The cavity H is further defined as the space between the inner door panel 24 and the outer door panel 26

The upper edge 24a includes a slot configured to receive a glass window W that is supported and operated to move the glass window W up and down by the window supporting mechanism 32 (also known as a window regulator assembly) in a conventional manner. Since window mechanisms (window regulator assemblies) are conventional mechanical or electro-mechanical mechanisms, further description is omitted for the sake of brevity. The rearward edge 24b (an inclined edge) of the inner door panel 24 extends downward from a rear end of the upper edge 24a to the bottom edge 24c. In the depicted embodiment, the rearward edge 24b is inclined in a forward direction, moving downward and forward from the upper edge 24a to the bottom edge 24c. In other words, the rearward edge 24b is angled extending upward in the rearward direction from the bottom edge 24c to the upper edge 24a. It should be understood from the drawings and the description herein that the rearward edge 24b can be shaped and contoured to complement the shape and contours of a rear wheel well of the vehicle 10. Alternatively, the rear door 16 can have a more rectangular-like shape.

The bottom edge 24c is generally straight and extends horizontally (with the vehicle 10 being level) from a lower end of the rearward edge 24b to a lower edge of the forward edge 24b. The forward edge 24d is generally straight as viewed from the side in FIG. 2. The forward edge 24d extends upward from a front end of the bottom edge 24c to a forward end of the upper edge 24a. As shown in perspective view looking rearward, the forward edge 24d, the rearward edge 24b and the outer door panel 26 are all curved and contoured in accordance with the overall design of the vehicle 10.

Figure 6:
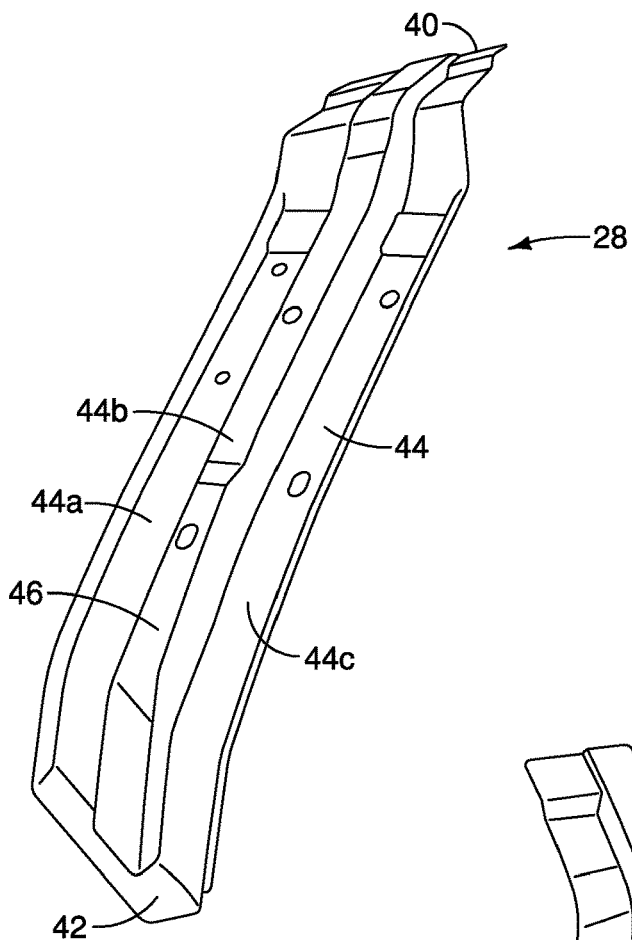
FIG. 6 is a first perspective view of the reinforcement beam showing an outboard surface thereof in accordance with the first embodiment.
Figure 7:
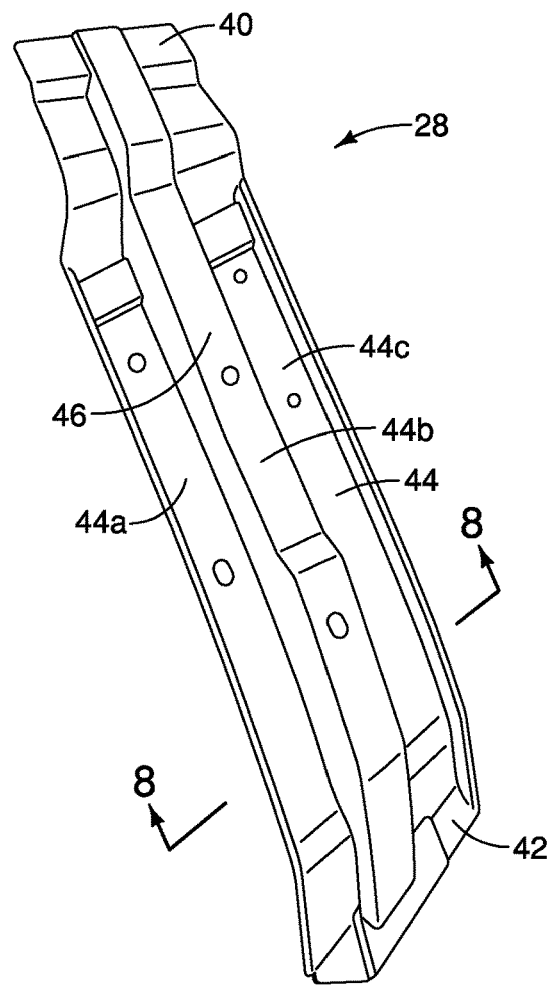
FIG. 7 is a second perspective view of the reinforcement beam showing the outboard surface thereof in accordance with the first embodiment.
Figure 8:
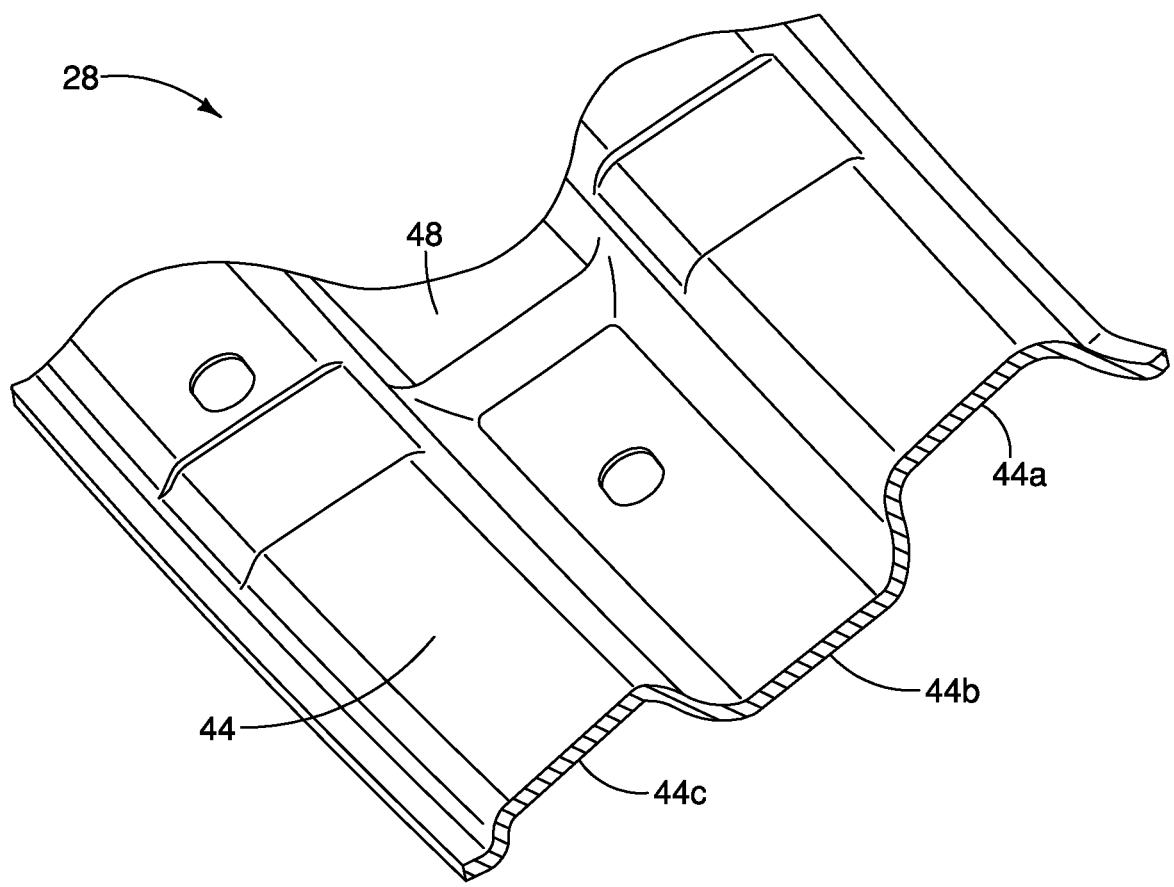
FIG. 8 is a perspective cross-sectional view of the reinforcement beam showing an inboard surface thereof in accordance with the first embodiment.
Figure 9:
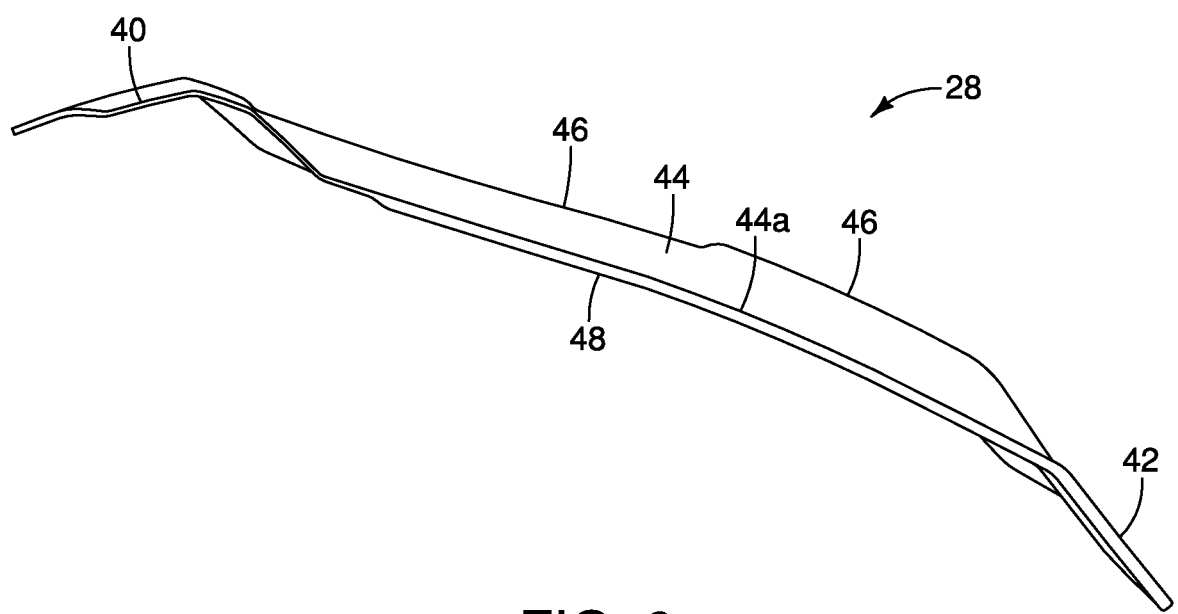
FIG. 9 is an end view of the reinforcement beam in accordance with the first embodiment.

The first reinforcement beam 28 is now described with reference to FIGS. 3-9. As shown in FIGS. 6, 7 and 9, the first reinforcement beam 28 has an upper end 40, a lower end 42 and a mid-portion 44. The first reinforcement beam 28 further has an inboard facing surface 46 (FIGS. 4-7 and 9) and an outboard facing surface 48 (FIGS. 8 and 9 only). The upper end 40, which defines an upper attachment flange, is rigidly attached to the inner door panel 24 adjacent to the upper edge 24a via, for example one of a variety of conventional welding techniques or mechanical fasteners. Similarly, the lower end 42, which defines an attachment flange, is rigidly attached to the inner door panel 24 adjacent to the rearward edge 24b via, for example, any one of a variety of conventional welding techniques or mechanical fasteners.

As shown in FIGS. 6-9, the mid-portion 44 of the first reinforcement beam 28 includes off-set portions 44a, 44b and 44c that define ribs that extend from proximate the upper end 40 to the lower end 42. The off-set portions 44a and 44c are generally parallel to one another with the off-set portion 44b extending inboard relative to the off-set portions 44a and 44c.

The first reinforcement beam 28 is an upwardly extending bracket within the cavity H that extends upwardly from the bottom edge 24c of the inner door panel 24 to the upper edge 24a of the inner door panel 24. The first reinforcement beam 28 is approximately vertically oriented, but, as shown in FIG. 5, the first reinforcement beam 28 (the upwardly extending bracket) is inclined relative to vertical by an angle α of between 10 and 30 degrees. In the depicted embodiment, the first reinforcement beam 28 is inclined relative to vertical by about 18 degrees. In other words, in the depicted embodiment the angle α is about 18 degrees. The bottom edge 24c and the rearward edge 24b (the inclined edge) of the inner door panel 24 define an obtuse angle measured therebetween. The obtuse angle is between an angle that is between 110 and 140 degrees. In the depicted embodiment, the obtuse angle is approximately 130 degrees.

Figure 29:
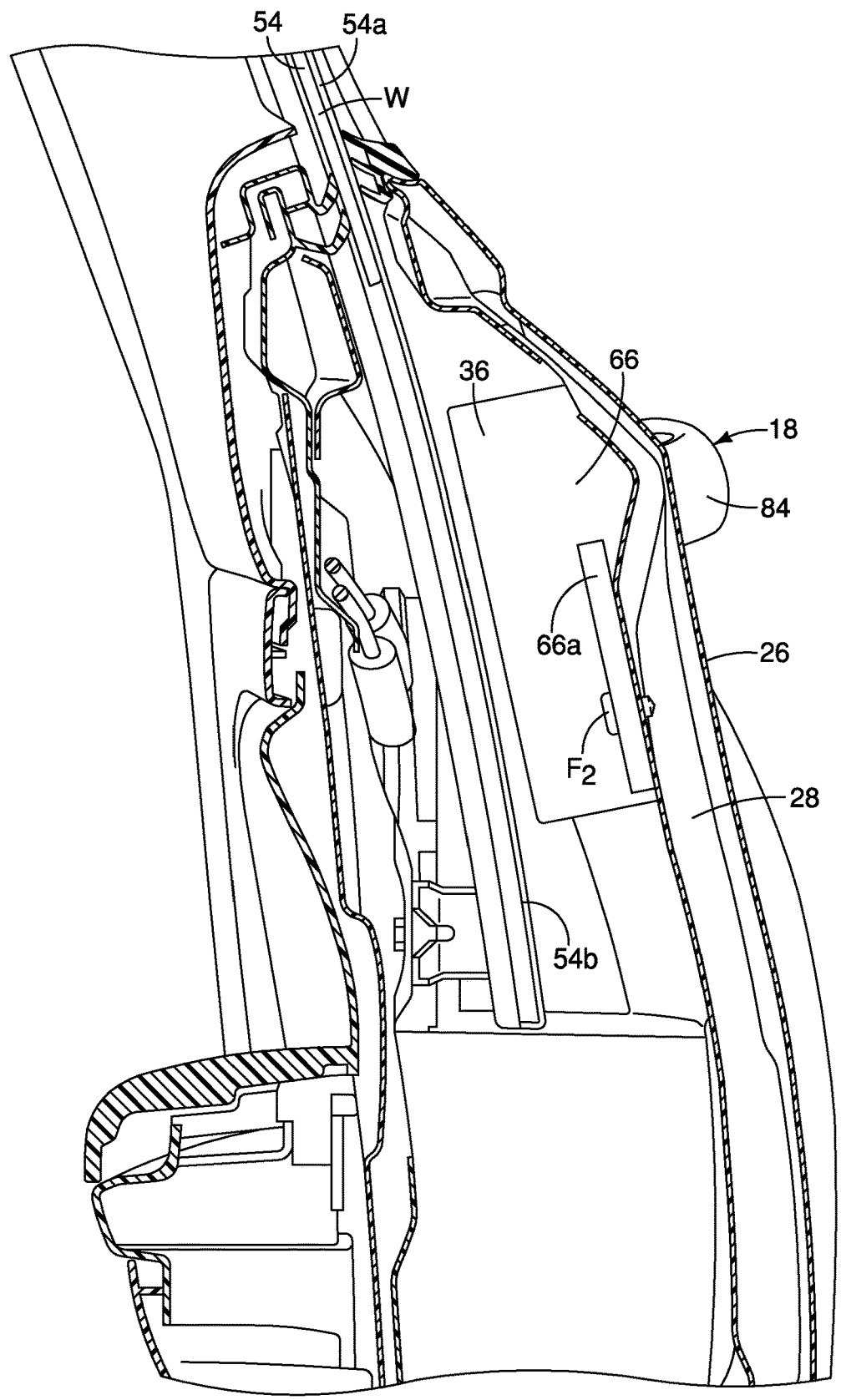
FIG. 29 is a cross-sectional view of the door handle assembly taken along the line 29-29 in FIG. 2 in accordance with the first embodiment.

In the depicted embodiment, the upper end 40 and the lower end 42 of the first reinforcement beam 28 is shown fixed to the inner door panel 24. However, the first reinforcement beam 28 can alternatively be welded to the outer door panel 26. Still further, the first reinforcement beam 28 can also be fixed to both the inner door panel 24 and the outer door panel 26 via combinations of mechanical fasteners or welding techniques. As well, the upper end 40 (the upper attachment flange) is fixedly to the at least one of the inner door panel 24 and/or the outer door panel 26 proximate a central area of a window opening defined by the rear door 16. As shown in FIGS. 4, 5 and 29, the first reinforcement beam 28 (the upwardly extending bracket) is spaced apart from the door handle assembly 18.

The second reinforcement beam 30 can be a ribbed member like the first reinforcement beam 28. However, in the depicted embodiment, the second reinforcement beam 30 has an overall tube shape. As shown in FIG. 4, a forward end of the second reinforcement beam 30 is fixed to the forward edge 24d of the inner door panel 24 via an attachment flange 50. The second reinforcement beam 30 is attached to the inner door panel 24 just above a mid-portion of forward edge 24d. A rearward end of the second reinforcement beam 30 is welded to the inner door panel 24 at a location below the lower end 42 of the first reinforcement beam 28 proximate the rearward edge 24b of the inner door panel 24. Alternatively, the second reinforcement beam 30 can be welded or fixed via mechanical fasteners to the outer door panel 26. The second reinforcement beam 30 basically extends side to side from proximate the forward edge 24d to proximate the rearward edge 24b. The second reinforcement beam 30 is not level, but rather is inclined downward going from the forward edge 24d toward the rearward edge 24b. The second reinforcement beam 30 is inclined by an angle that is between 25 and 35 degrees relative to the bottom edge 24c of the inner door panel 24. In the depicted embodiment, the angle between the second reinforcement beam 30 and the bottom edge 24c of the inner door panel 24 is approximately 28 degrees.

As shown in FIGS. 4 and 5, the window supporting mechanism 32 is installed to the rear door 16, and to portions of the inner door panel 24 via mechanical fasteners (not shown) in a conventional manner. The window mechanism 32 includes a window regulator 52 and window tracks 54 (only one window track 54 is shown in FIGS. 4 and 5). The window regulator 52 can be a manually operated mechanism (with a window crank arm—not shown) or can include an electric motor that opens and closes the window glass W. In other words, the window regulator 52 raises (closed position) and lowers (open position) the window glass W in a conventional manner. The window glass W is slidably retained by the window track 54 in a conventional manner. The window track 54 includes an exposed portion 54a that extends above the upper edge 24a of the inner door panel 24 and a concealed portion 54b located within the cavity H of the rear door 16. The window glass W is guided for up and down sliding movement along the window tracks 54 in a conventional manner.

As shown in FIGS. 4 and 5, the latch mechanism 34 is fixed via mechanical fasteners (not shown) in a conventional manner to the inner door panel 24 within the cavity H in a conventional manner. Since latch mechanisms are well known in the art, further description is omitted for the sake of brevity.

As shown in FIGS. 4 and 5, the vibration absorbing member 36 is installed within the cavity H and is fixed to the first inboard facing surface 46 of the first reinforcement beam 28, as is described in greater detail below.

As shown removed from the rear door 16 in FIGS. 10-14, the vibration absorbing member 36 has an inboard surface 56, an outboard surface 58, an upper side 60, a lower side 62, a rearward side 64 (a first end) and a forward side 66 (a second end).

Figure 10:
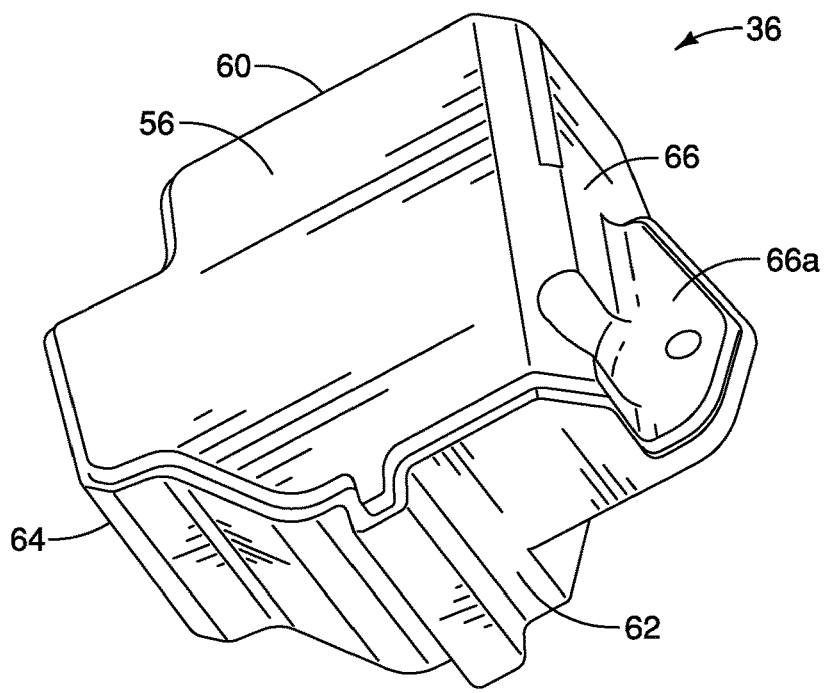
FIG. 10 is a perspective view of the vibration absorbing member removed from the rear door showing an inboard surface thereof in accordance with the first embodiment.
Figure 11:
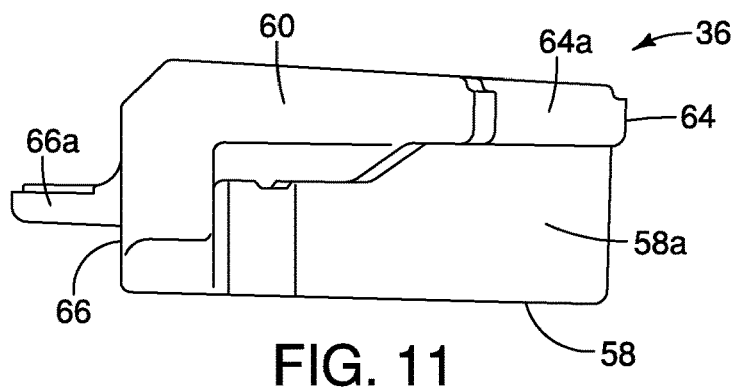
FIG. 11 is a top view of the vibration absorbing member showing a first attachment flange, a second attachment flange and a recess dimensioned to receive a portion of the door handle assembly in accordance with the first embodiment.
Figure 12:
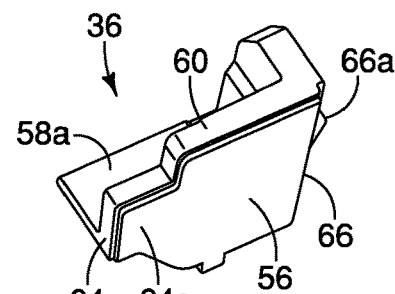
FIG. 12 another perspective view of the vibration absorbing member showing the first attachment flange, the second attachment flange, the inboard surface and a portion of the recess in accordance with the first embodiment.
Figure 13:
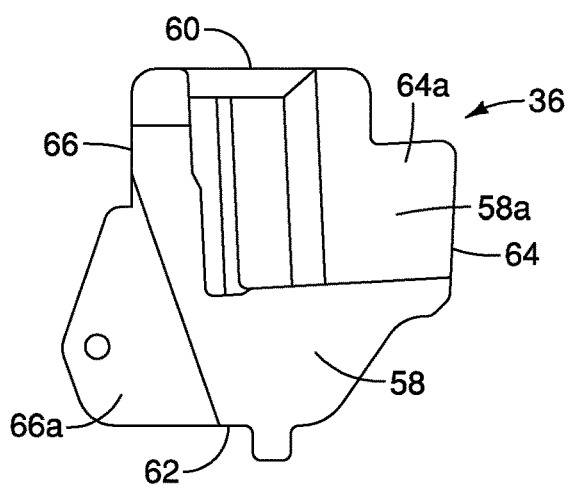
FIG. 13 a side view of the vibration absorbing member showing an inboard surface, the recess, the first attachment flange and the second attachment flange in accordance with the first embodiment.
Figure 14:
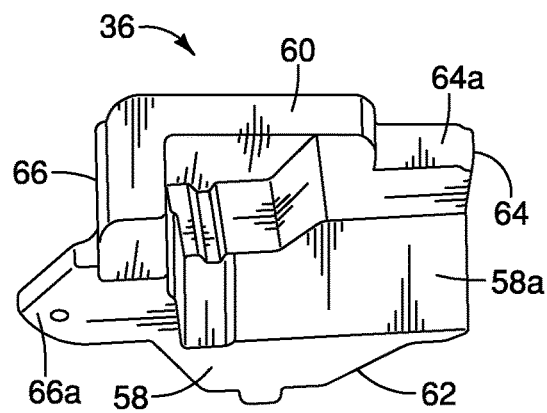
FIG. 14 yet another perspective view of the vibration absorbing member showing the first attachment flange, the second attachment flange, the inboard surface and the recess in accordance with the first embodiment.

As shown in FIG. 10, the inboard surface 56 of the vibration absorbing member 36 has the largest surface area of the various surfaces of the vibration absorbing member 36. With the vibration absorbing member 36 installed within the cavity H of the rear door 16, as described further below, a central portion of the inboard surface 56 is outboard of and overlays a section of the concealed portion 54b of the window track 54, as is described further below. However, as shown in FIG. 29, the vibration absorbing member 36 is spaced apart from the concealed portion 54b of the window track 54. As well, the vibration absorbing member 36 is outboard of the concealed portion 54b of the window track 54.

The outboard surface 58 includes a recessed area 58a that is dimensioned to receive a portion of the door handle assembly 18, as is described further below. The rearward side 64 (the first end) includes a wall portion that is defined between a portion of the outboard.

The rearward side 64 (the second end) includes an attachment flange 64a that is defined between a portion of the inboard surface 56 and a portion of the recessed area 58a, as shown in FIGS. 11-14.

The forward side 66 (the second end) includes an attachment flange 66a that is extends from the forward side 66 in a direction away from the recessed area 58a, as shown in FIGS. 10-14.

The vibration absorbing member 36 is at least partially made of a foam material that is selected for characteristics that absorb energy during an impact event.

As shown in FIG. 3, the outer door panel 26 (also referred to as the door panel 26) has an inboard surface 70 (FIGS. 19 and 20) and an outboard surface 72 (FIG. 3) with a first handle opening 74 and a second handle opening 76. The second handle opening 76 is located rearward of the first handle opening 74. Each of the first handle opening 74 and the second handle opening 76 extends from the inboard surface 70 to the outboard surface 72, as is described further below. As shown in FIGS. 2 and 3, the outboard surface 72 includes a concaved portion 72a (a depression) that is shaped and dimensioned to accommodate a person's hand when gripping an operation handle 84 in order to open the rear door 16. The concaved portion 72a is located between the first handle opening 74 and the second handle opening 76.

As shown in FIG. 3, the door handle assembly 18 basically includes a handle base bracket 80, a metallic reinforcement bracket 82, an operation handle 84, a first fastener 86 and gaskets 88 and 90. A detailed description of the various elements of the door handle assembly 18 are described herein below with specific reference to FIGS. 15-24.

The description below of the door handle assembly 18 provides description of various features of the door handle assembly 18. The basic operation of the door handle assembly 18 is generally known and is described in, for example, U.S. Pat. No. 7,568,744, issued Aug. 4, 2009. The entire contents of U.S. Pat. No. 7,568,744 are incorporated herein by reference in its entirety. Therefore, description basic operation of the door handle assembly 18 will be omitted for the sake of brevity.

As shown in FIG. 3, the operation handle 84, the first fastener 86 and the gaskets 88 and 90 of the door handle assembly 18 are installed from the outboard side of the outer door panel 26. The handle base bracket 80 and the metallic reinforcement bracket 82 of the door handle assembly 18 are installed to the outer door panel 26 from the inboard side thereof.

Figure 15:
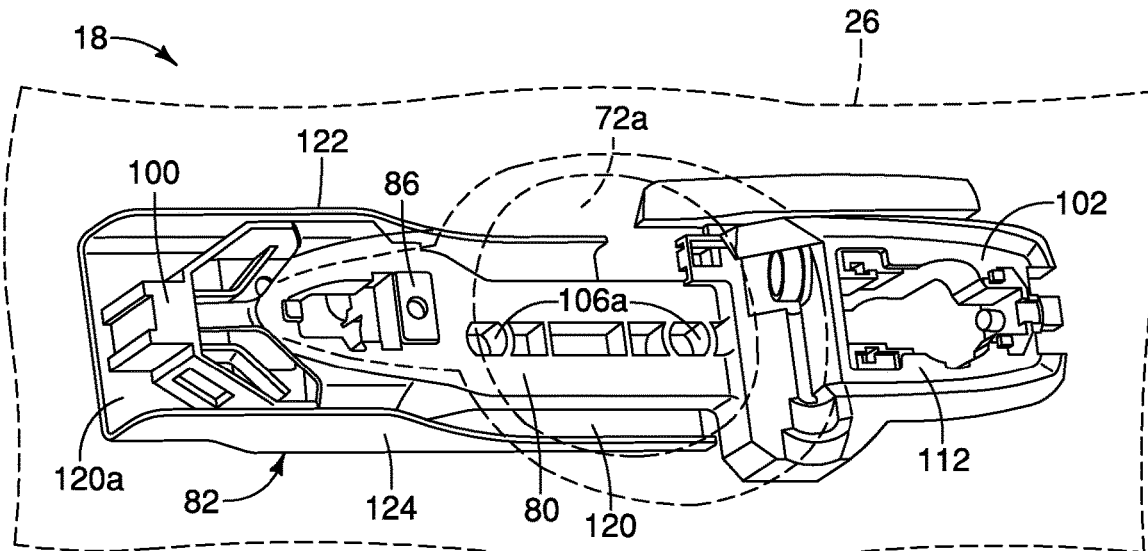
FIG. 15 is a first perspective view of the door handle assembly showing an outboard surface, a first fastener and a projection of a handle base bracket, a metallic reinforcement bracket, with portions of the outer door panel shown in phantom in accordance with the first embodiment.
Figure 16:
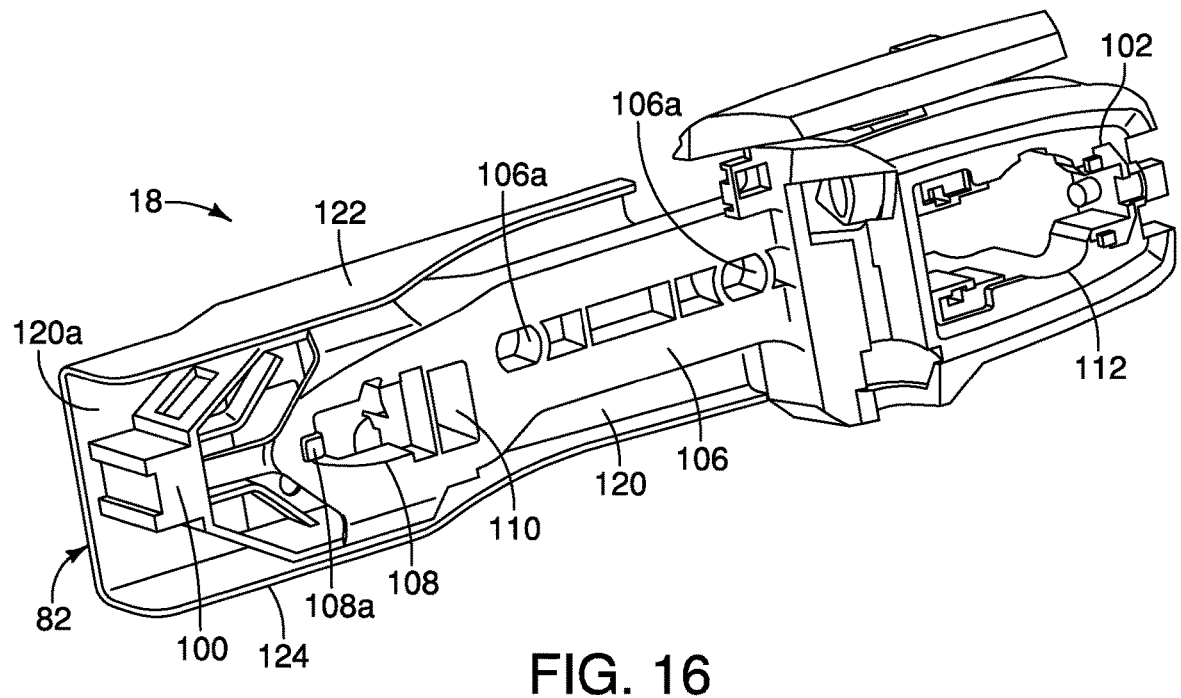
FIG. 16 is a second perspective view of the door handle assembly showing the outboard surface, a fastener opening (with the first fastener removed) and the projection of the handle base bracket along with the metallic reinforcement bracket, in accordance with the first embodiment.
Figure 17:
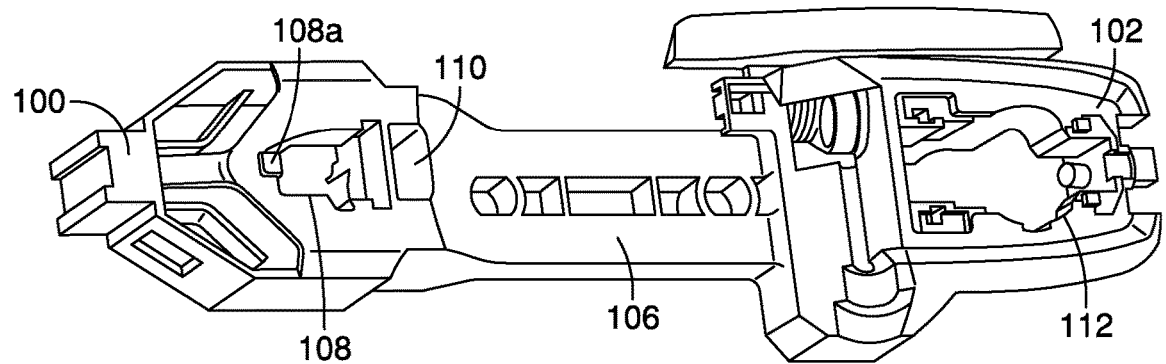
FIG. 17 is a perspective view of the handle base bracket of the door handle assembly with the metallic reinforcement bracket removed showing the outboard surface, the fastener opening and the projection of the handle base bracket in accordance with the first embodiment.
Figure 18:
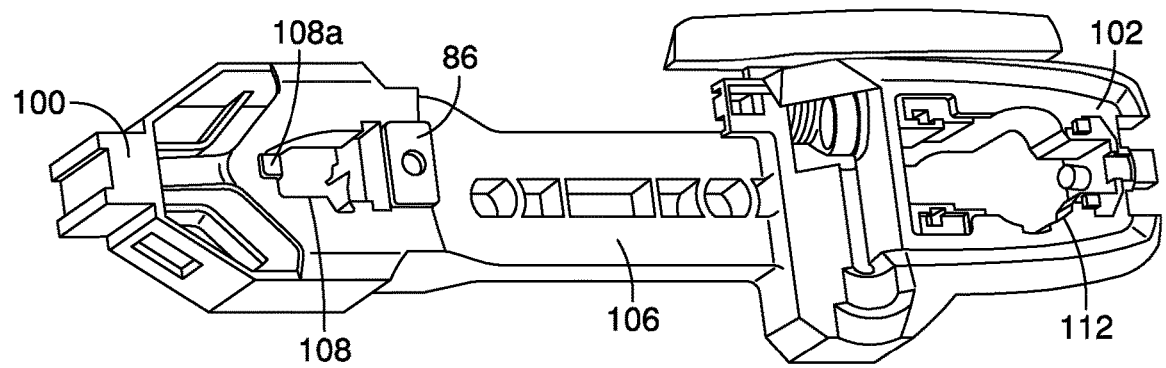
FIG. 18 is another perspective view of the handle base bracket showing the outboard surface, the first fastener installed in the fastener opening and the projection in accordance with the first embodiment.
Figure 19:
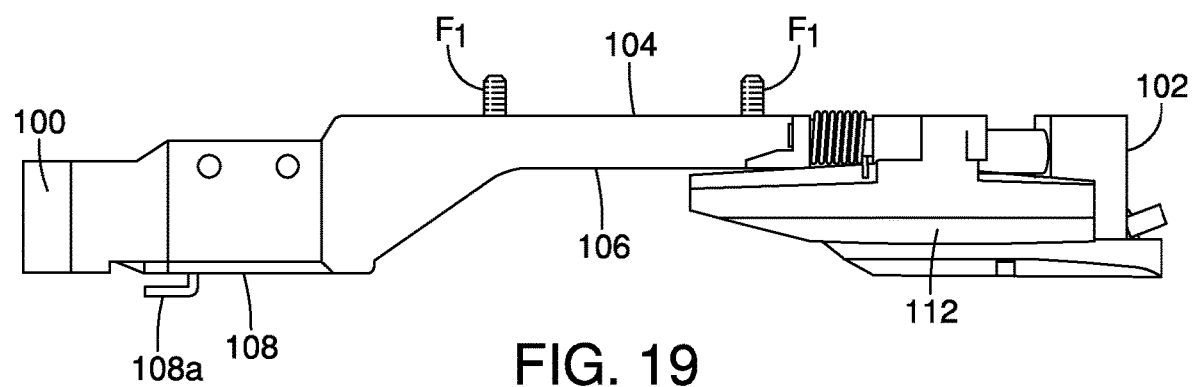
FIG. 19 is a top view of the handle base bracket in accordance with the first embodiment.
Figure 20:
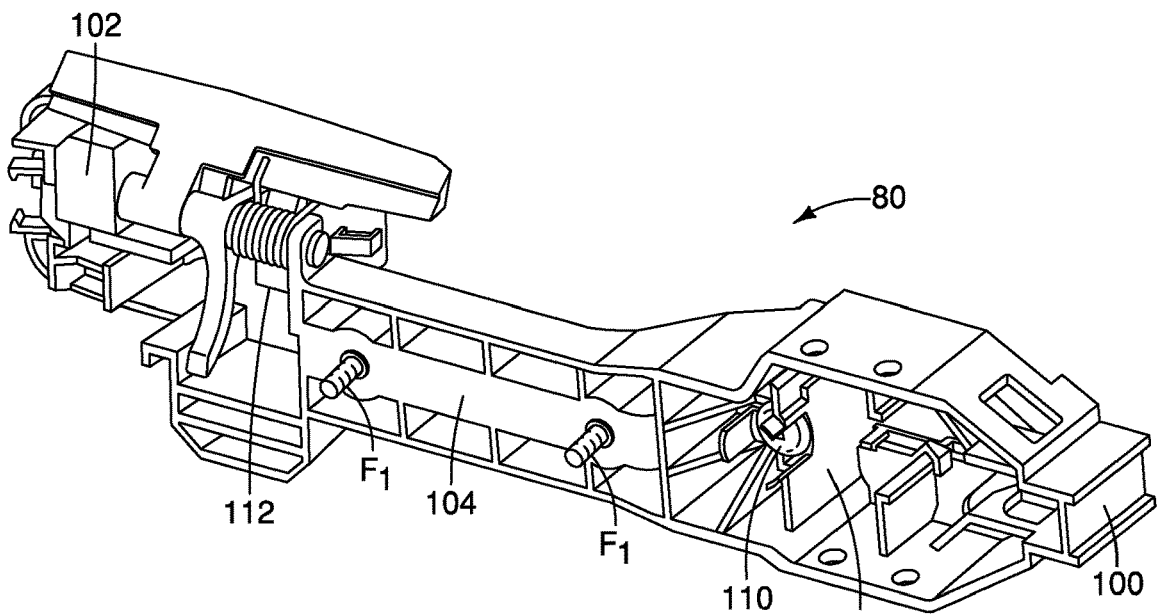
FIG. 20 is another perspective view of the handle base bracket showing an inboard surface and a pair of fasteners extending from the inboard surface in accordance with the first embodiment.
Figure 21:
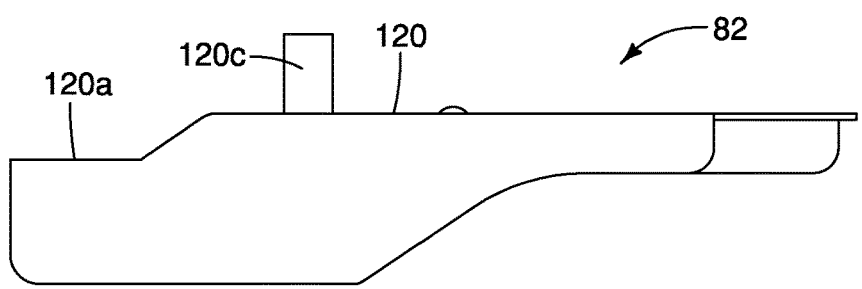
FIG. 21 is a top view of the metallic reinforcement bracket removed from the handle base bracket in accordance with the first embodiment.
Figure 22:
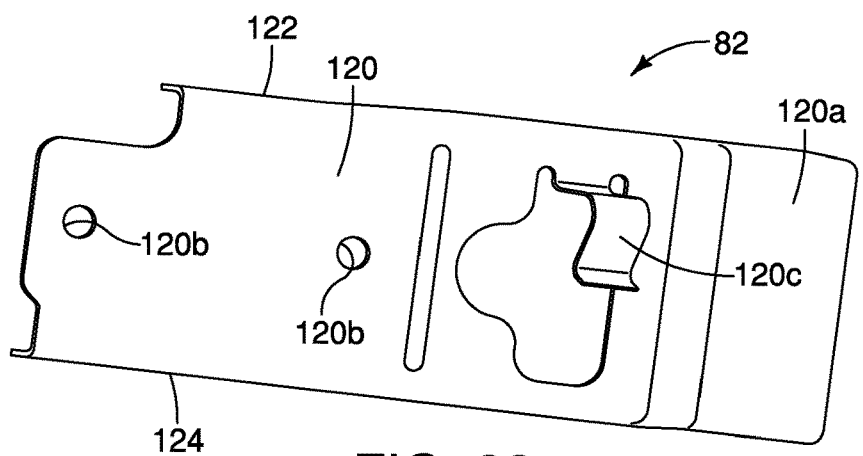
FIG. 22 is a side view of the metallic reinforcement bracket removed from the handle base bracket showing an inboard side thereof in accordance with the first embodiment.

A description of the handle base bracket 80 and the metallic reinforcement bracket 82 is provided now with specific reference to FIGS. 15-26. FIGS. 15, 16, 23 and 24 show the metallic reinforcement bracket 82 attached to the handle base bracket 80. FIGS. 17-19 show the handle base bracket 80 with the metallic reinforcement bracket 82 removed. FIGS. 21 and 22 show the metallic reinforcement bracket 82 removed from the handle base bracket 80.

The handle base bracket 80 has a forward end 100, a rearward end 102, an inboard surface 104 and an outboard surface 106. The handle base bracket 80 defines a first handle receiving section 108, a fastener opening 110 and a second handle receiving section 112.

As shown in FIGS. 17 and 19, the first handle receiving section 108 has a first overall length and the second handle receiving section 112 has a second overall length with the first overall length being less than the second overall length. The first handle receiving section 108 defines the fastener opening 110 therein.

The first handle receiving section 108 includes an opening that extends from the inboard surface 104 to the outboard surface 106 and is located at the forward end 100 of the handle base bracket 80. The first handle receiving section 108 also includes a projection 108a that extends outboard from the outboard surface 106 of the handle base bracket 80, as shown in FIGS. 17-19. The projection 108a defines a hook-like structure that is dimensioned to extends through the first handle opening 74 of the outer door panel 26 and hook on to and contact the outboard surface 72 of the outer door panel in order to at least partially retain the handle base bracket 80 to the outer door panel 26.

The first handle receiving section 108 includes pivoting structures (not shown) that engage the operation handle 84 allowing the operation handle 84 to pivot about the pivoting structures (not shown) in a conventional manner. For example, see U.S. Pat. No. 7,568,744. The fastener opening 110 is located adjacent to and rearward of first handle receiving section 108. The fastener opening 110 also extends through the first handle receiving section 108 from the inboard surface 104 to the outboard surface 106.

As shown in FIGS. 16 and 17, the fastener opening 110 has a rectangular shape. More specifically, the fastener opening 110 is shaped and dimensioned to receive the first fastener 86 (FIGS. 35-38) such that the first fastener 86 is prevented from rotating when installed within the fastener opening 110, as described further below.

The second handle receiving section 112 of the handle base bracket 80 includes an opening that has associated with it a latch releasing mechanism that is connected to the latch mechanism 34 via conventional cable. With the operation handle 84 installed to the door handle assembly 18, a portion of the operation handle 84 extends into the second handle receiving section 112 and engages the latch releasing mechanism such that the latch mechanism 34 is operated to open the rear door 16. An explanation of operation of the latch releasing mechanism is presented in, for example, see U.S. Pat. No. 7,568,744. Therefore, further description is omitted for the sake of brevity.

A portion of the outboard surface 106 of the handle base bracket 80 has a curved or contoured area such that with the door handle assembly 18 fully installed to the outer door panel 26, (in an fully assembled state) the outboard surface 106 of the handle base bracket 80 overlays a portion of the inboard surface 70 of the outer door panel 26 corresponding to the concaved portion 72a of the outer door panel 26.

Further, in the fully assembled state, the first handle receiving section 108 aligns with and surrounds the first handle opening 74 of the outer door panel 26, and, the second handle receiving section 112 aligns with and surrounds the second handle opening 76 of the outer door panel 26 along the inboard surface 72 of the outer door panel 26.

Figure 23:
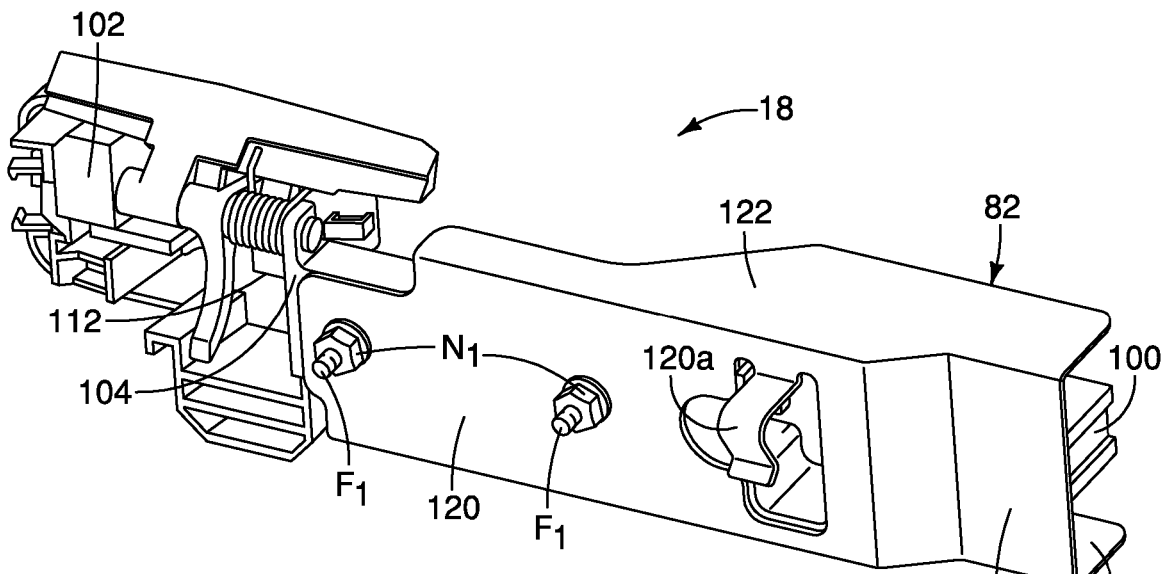
FIG. 23 is a perspective view of the metallic reinforcement bracket installed to the handle base bracket in accordance with the first embodiment.

The outboard surface 106 of the handle base bracket 80 includes a pair of fastener openings 106a (FIGS. 15 and 16). Fasteners $F_1$ are non-rotatably installed through the openings 106a such that threaded portions of the fasteners $F_1$ extend inboard from the inboard surface 104 of the handle base bracket 80 as shown in FIGS. 19, 20 and 23. More specifically, as shown in FIG. 19, the fasteners $F_1$ have threaded portions that extend in the inboard direction Di from the inboard surface 104 of the handle base bracket 80.

Figure 24:
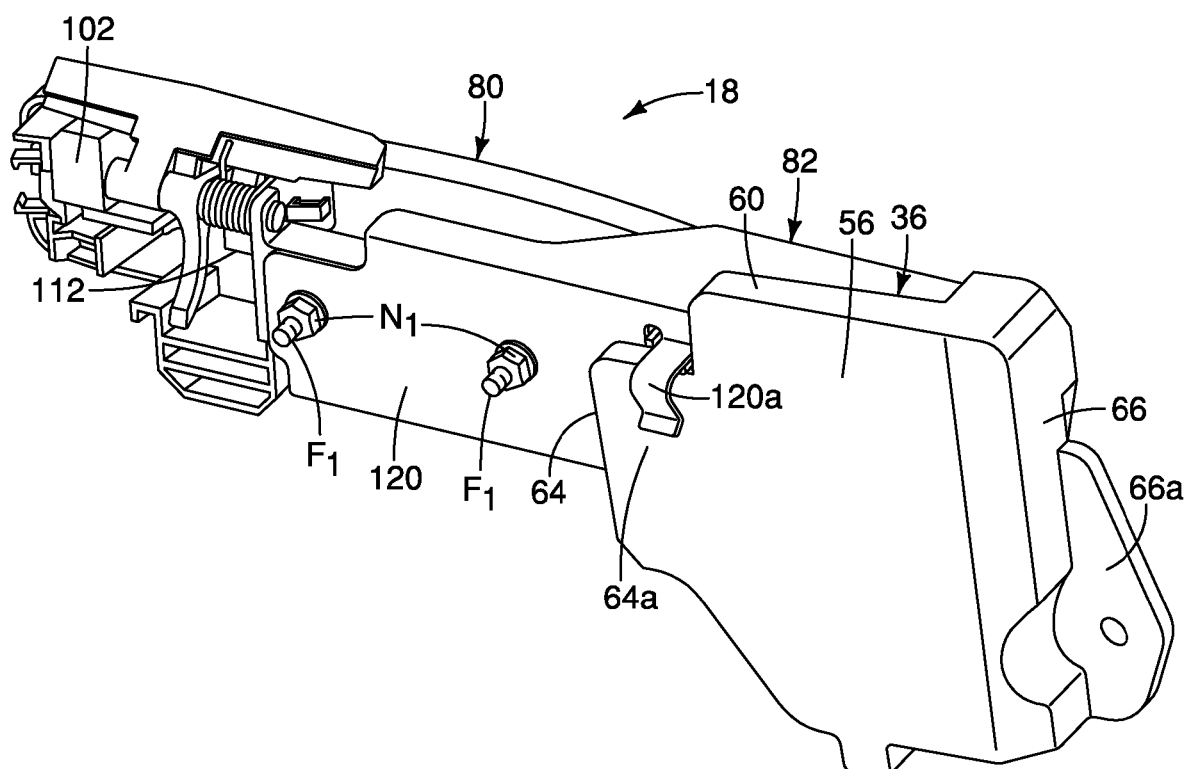
FIG. 24 is another perspective view of the metallic reinforcement bracket installed to the handle base bracket showing the vibration absorbing member 36 attached to the metallic reinforcement bracket in accordance with the first embodiment.
Figure 27:
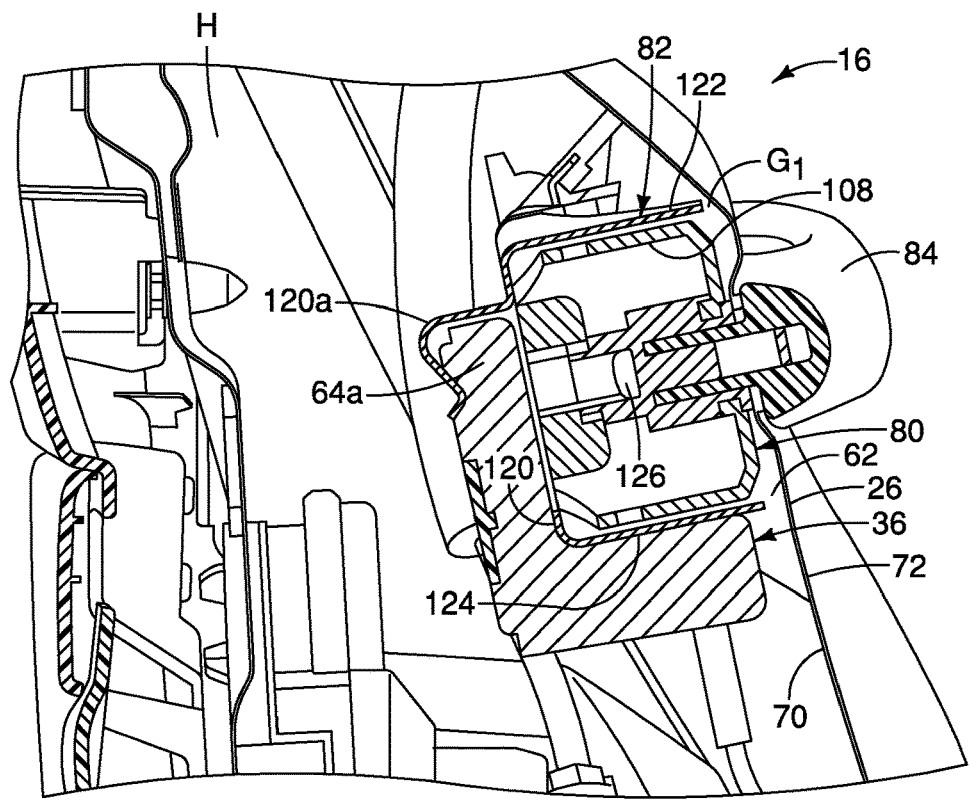
FIG. 27 is a cross-sectional view of the door handle assembly taken along the line 27-27 in FIG. 2 in accordance with the first embodiment.

The metallic reinforcement bracket 82 has a main section 120, a first side flange 122 (an upper flange) and a second side flange 124 (a lower flange). The main section 120 is generally planar but can include an offset portion 120a that is also planar, extending parallel to the main section 120. The main section 120 includes two openings 120b that receive respective ones of the threaded portions of the fasteners $F_1$. As shown in FIG. 23, threaded nuts $N_1$ installed to the fasteners $F_1$ thereby fixed attaching the metallic reinforcement bracket 82 to the inboard surface 104 of the handle base bracket 80. The main section 120 also includes a hook-shaped projection or clip 120c that attaches to the attachment flange 64a of the vibration absorbing member 36, as shown in FIGS. 24 and 27. The clip 120c is also referred to herein as a connection structure of the door handle assembly 18.

Figure 28:
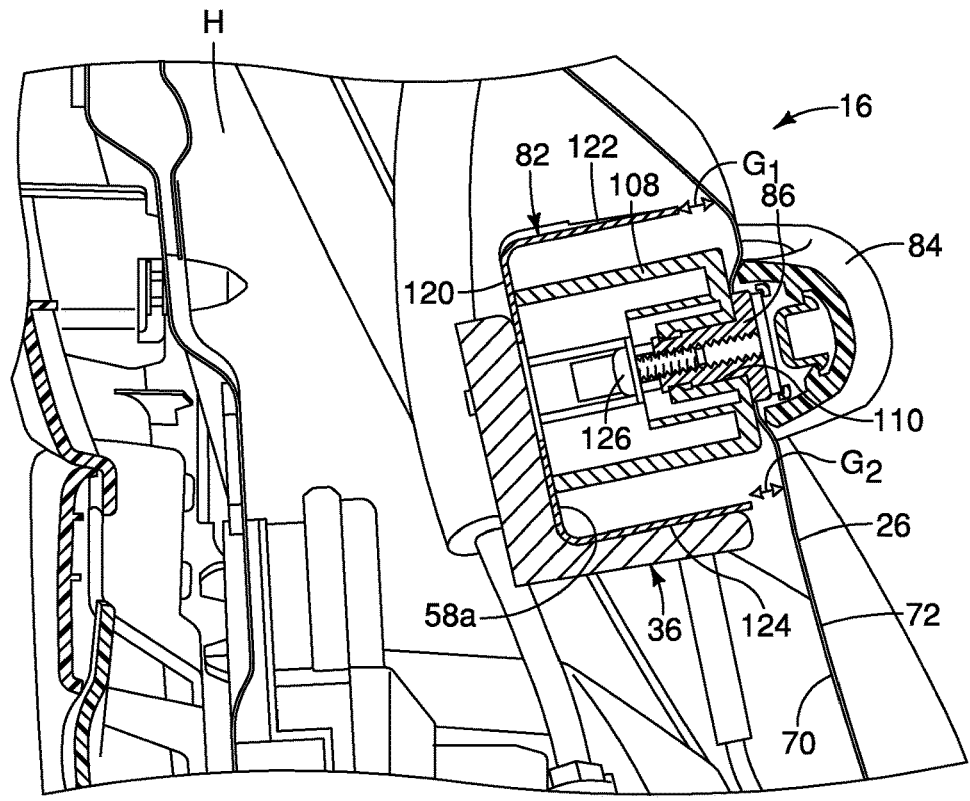
FIG. 28 is a cross-sectional view of the door handle assembly taken along the line 28-28 in FIG. 2 in accordance with the first embodiment.

With the door handle assembly 18 installed to the outer door panel 26, the first and second side flanges 122 and 124 extend parallel to one another in an outboard direction from opposite edges of the main section 120 covering upper and lower sides of portions of the handle base bracket 80. The first and second side flanges 122 and 124 also extend in directions perpendicular to the main section 120. The first and second side flanges 122 and 124 extend toward the inboard surface 70 of the outer door panel 26, but are spaced apart therefrom, defining gaps $G_1$ and $G_2$, as shown in FIGS. 27 and 28.

With reference to FIGS. 30-33, a description of installing the door handle assembly 18 to the outer door panel 26 is now provided.

Figure 30:
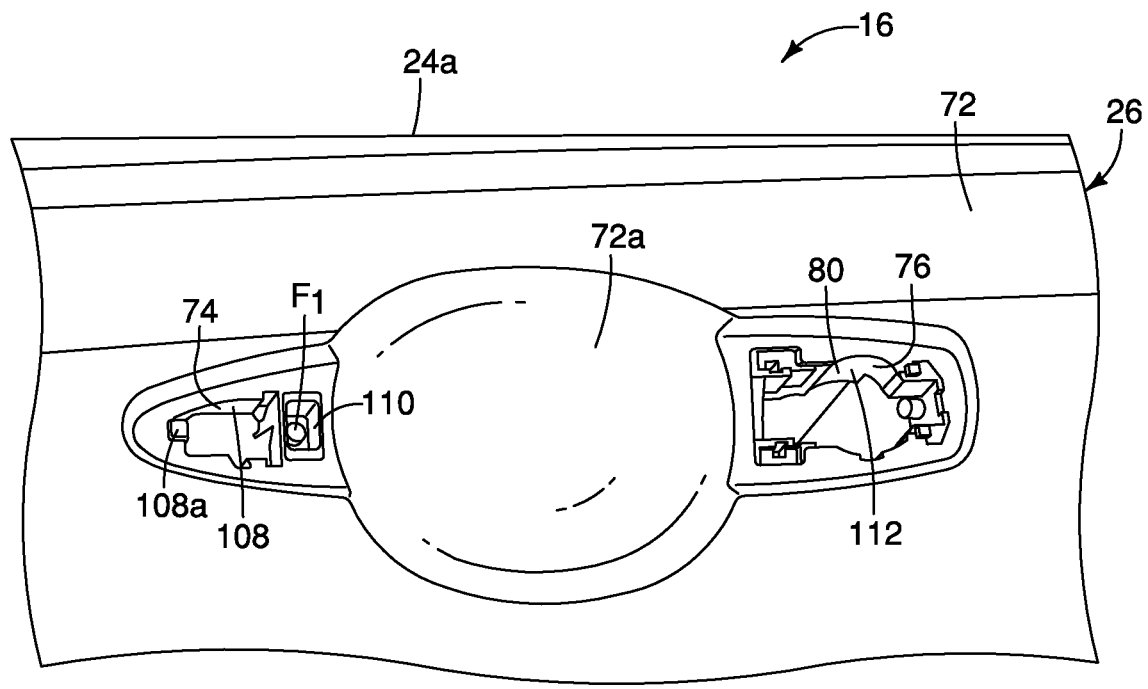
FIG. 30 is a first side view of the rear door showing the handle base bracket hooked to the outer door panel by the projection of the handle base bracket showing the fastener opening in the handle base bracket in an early stage of assembly of the door handle assembly to the outer door panel in accordance with the first embodiment.
Figure 31:
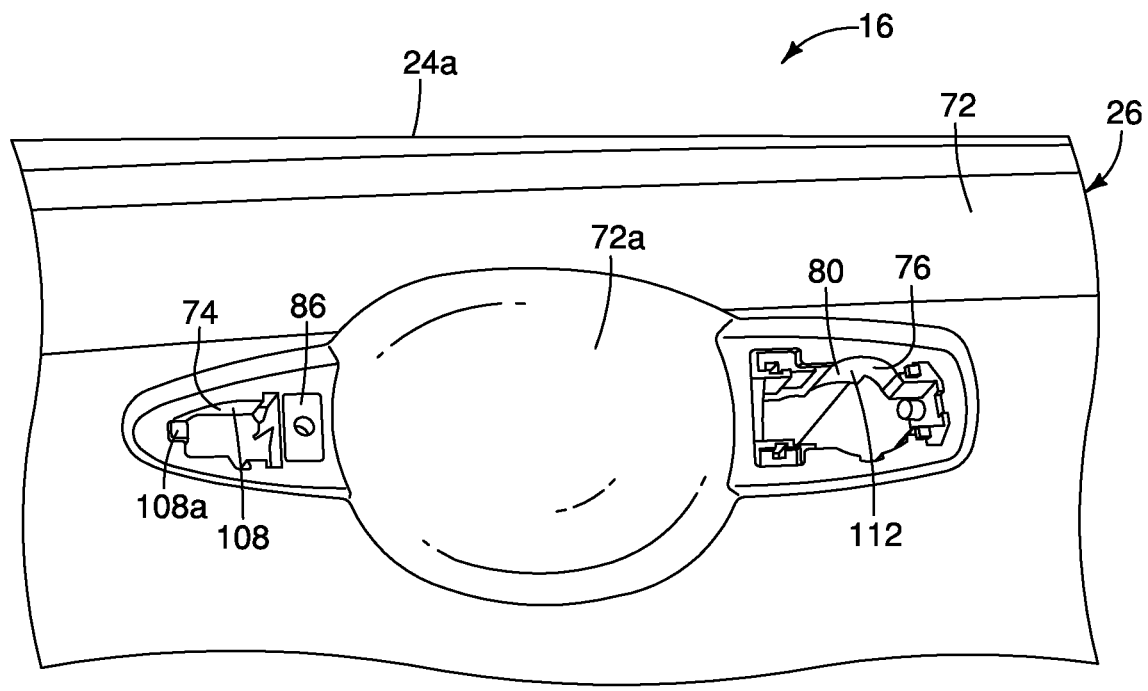
FIG. 31 is a second side view of the rear door showing the handle base bracket hooked to the outer door panel by the projection of the handle base bracket with the first fastener installed to the fastener opening of the handle base bracket in an intermediate stage of assembly of the door handle assembly to the outer door panel in accordance with the first embodiment.

As shown in FIG. 30 (and as well as FIGS. 27 and 28), the handle base bracket 80 is first installed along the inboard surface 70 of the outer door panel 26. During installation, the projection 108a of the first handle receiving section 108 is inserted through the first handle opening 74 of the outer door panel 26, and moved such that the projection 108a hooks onto that portion of the outer door panel 26 adjacent to a forward end of the first handle opening 74 of the outer door panel 26, as shown in FIGS. 30 and 31. As is also shown in FIG. 30, the opening defined in the first handle receiving section 108 aligns with the first handle opening 74 of the outer door panel 26 and the opening in the second handle receiving section 112 aligns the second handle opening 76 of the outer door panel 26.

Figure 25:
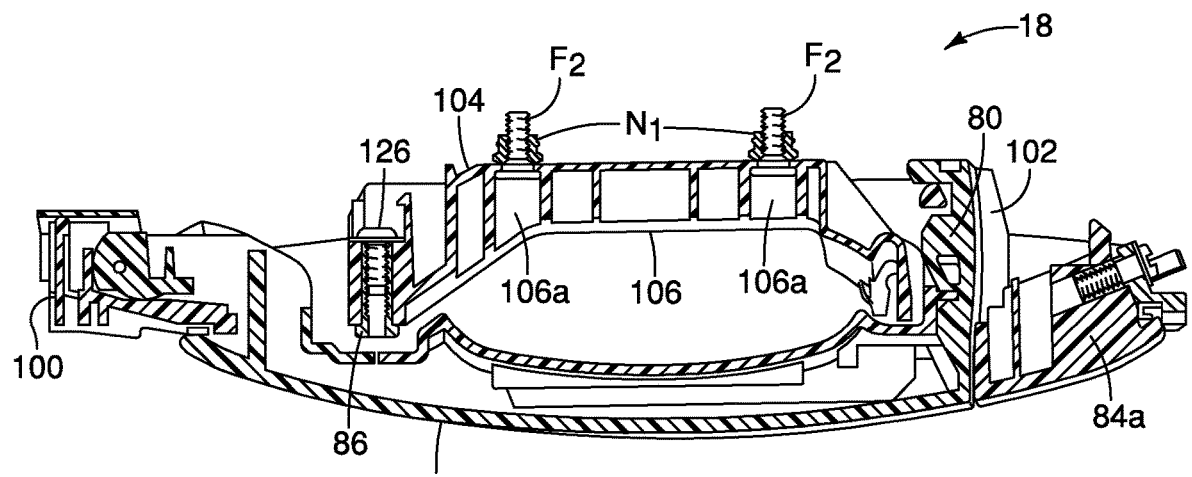
FIG. 25 is a cross-sectional view of the door handle assembly removed from the rear door, taken along the line 26-26 in FIG. 2 with the operation handle in an at rest orientation in accordance with the first embodiment.
Figure 26:
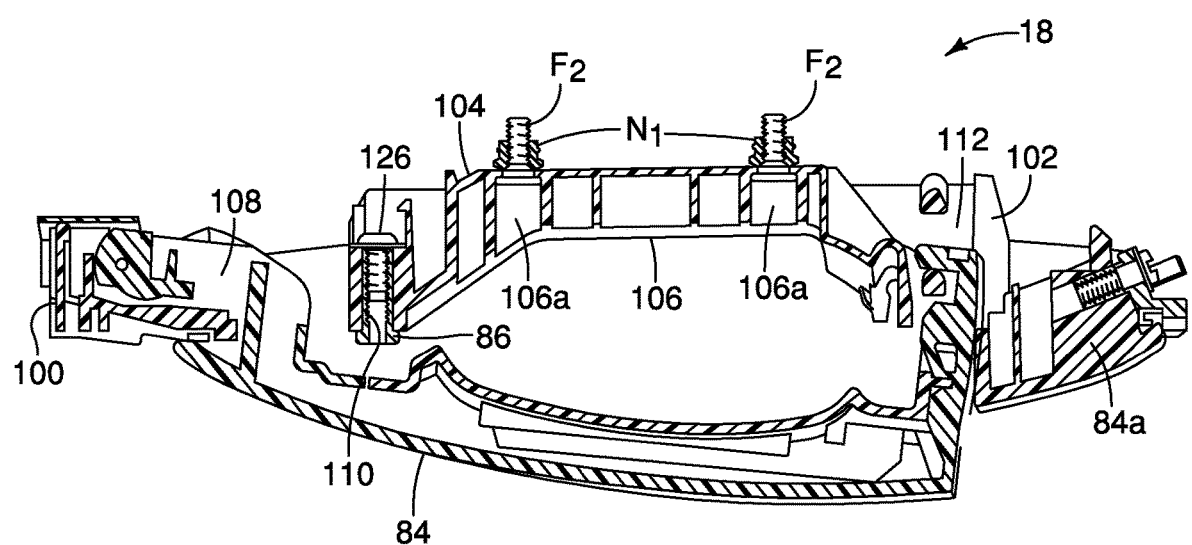
FIG. 26 is another cross-sectional view of the door handle assembly removed from the rear door, taken along the line 26-26 in FIG. 2 with the operation handle in an door opening orientation in accordance with the first embodiment.

As shown in FIG. 31, the first fastener 86 is then inserted into the fastener opening 110. As shown in FIG. 30, the fastener opening 110 has a rectangular shape. As shown in FIGS. 34-37, the first fastener 86 has a rectangular shaped head 86a and a rectangular shaped shank 86b. The head 86a of the first fastener 86 has an opening 86c that extends through the shank 86b. Since the shank 86b of the first fastener 86 is rectangular and fits snugly into the fastener opening 110 of the handle base bracket 80, the first fastener 86 is prevented from rotating. With the first fastener 86 installed into the fastener opening 110 of the handle base bracket 80, the head 86a of the first fastener 86 overlays adjacent portions of the outboard surface 72 of the outer door panel 26. As shown in FIGS. 25 and 26, a second fastener 126 is threaded into the opening 86c of the first fastener 86. Once the second fastener 126 is tightened, the head 86a of the first fastener 86 clamps on to the adjacent portions of the outboard surface 72 of the outer door panel 26. The combination of the projection 108a and the head 86a of the first fastener 86 engaging the outer door panel 26 retains the handle base bracket 80 in position relative to the outer door panel 26. Additional fasteners fix the second handle receiving section 112 of the handle base bracket 80 to the outer door panel 26 in a conventional manner.

Figure 32:
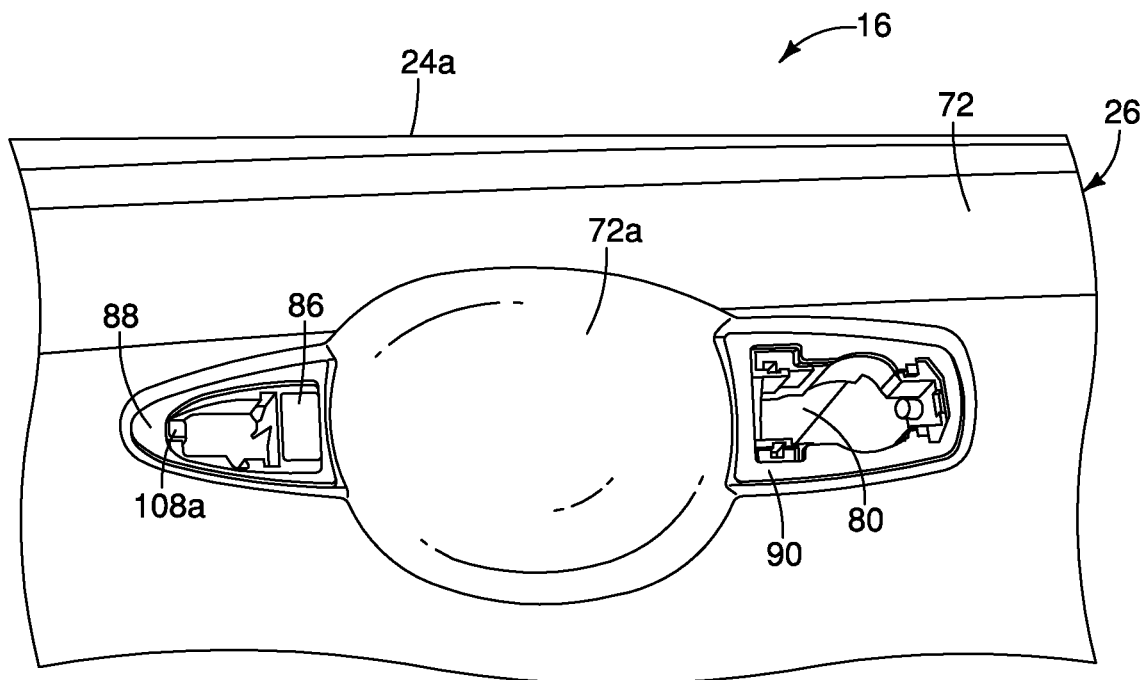
FIG. 32 is a third side view of the rear door showing a pair of gaskets overlaying portions of the outboard surface of the outer door panel, the gaskets being snap fitted to portions of the handle base bracket in another intermediate stage of assembly of the door handle assembly to the outer door panel in accordance with the first embodiment.

Next, as shown in FIG. 32, the gaskets 88 and 90 are positioned around respective ones of the first handle opening 74 and the second handle opening 36, snap fitting to corresponding portions of the handle base bracket 100 via snap fitting projections (not shown) formed on the gaskets 88 and 90 and snap projection receiving portions formed in the first handle receiving section 108 and the second handle receiving section 112.

Figure 33:
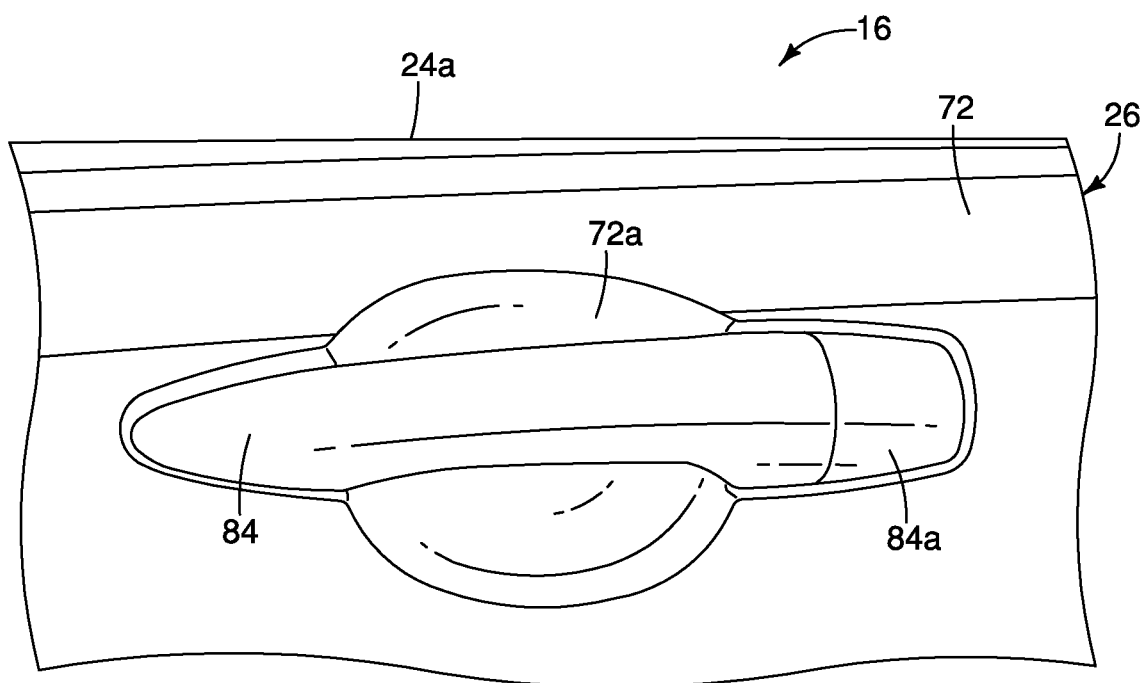
FIG. 33 is a fourth side view of the rear door showing the operation handle installed to corresponding portions of the handle base bracket in a final stage of assembly of the door handle assembly to the outer door panel in accordance with the first embodiment.

Finally, as shown in FIG. 33, the operation handle 84 is installed with respective projecting portions (projections) of the operation handle 84 extending through the first handle opening 74 and the second handle opening 36 and into corresponding ones of the openings in the first handle receiving section 108 and the second handle receiving section 112. Thereafter, a cover 84a is attached to a rearward end of the handle base bracket 80, as shown in FIGS. 2 and 33.

As shown in FIGS. 25 and 26, once the operation handle 84 is installed, the operation handle 84 can pivot about structures (not shown) in the first handle receiving section 108 of the handle base bracket 80 from an at rest orientation shown in FIG. 25, to a door opening orientation shown in FIG. 26. Again, see U.S. Pat. No. 7,568,744 for a further description of operation of the door handle assembly 18.

During the installation process, an inboard portion of the door handle assembly 18, including the first handle receiving section 108, is positioned within the recessed area 58a of the vibration absorbing member 36, as shown in FIGS. 24, 27 and 28. Simultaneously, the clip 120c engages and clamps to the flange 64a of the vibration absorbing member 36, as shown in FIGS. 24 and 27.

Further, as shown in FIG. 29, a fastener $F_2$ is inserted into the opening in the attachment flange 66a of the vibration absorbing member 36 and further through an opening in the first reinforcing beam 28 fixedly attaching the vibration absorbing member 36 to the first reinforcing beam 28. The fastener $F_2$ can be a threaded fastener, a rivet or a snap fitting member (a push pin) with a large head at one end contacting the inboard surface of the attachment flange 66a and a compressible and expandable arrow shaped head (a snap-fitting end) that fits through the opening in the first reinforcing beam 28 and contacts an outboard surface of the first reinforcing beam 28.

As shown in FIGS. 31, 34, 35 and 37, a forward-facing edge of the head portion or head 86a of the first fastener 86 has a linear shape. This edge of the head 86a is straight in order to avoid interference with movement of the operation handle 84. The remaining edges of the head 86a are dimensioned to maximize surface area contact with the adjacent portions of the outboard surface 72 of the outer door panel 26. In other words, the rectangular shape of the head 86a is not required. Rather, the head 86a of the first fastener 86 can have any of a variety of shapes and is not limited to the depicted rectangular shape.

The above described structures provide at least three benefits over door assemblies without such structures. First, the vibration absorbing member 36 being disposed between and being attached to each of the door handle assembly 18 and the first reinforcement beam 28 reduces vibrations that may occur within the rear door 16. Second, in response to an impact event, the inclusion of the metallic reinforcement bracket 82 reduces the possibility of deformation of the handle base bracket 80. Specifically, the metallic reinforcement bracket 82 and the handle base bracket 80 are fixed to one another by spaced apart fasteners $F_1$ and nuts $N_1$. The combination of the metallic reinforcement bracket 82 and the handle base bracket 80 establishes a rigidity that is significantly greater than the rigidity of the handle base bracket 80 alone in response to a side impact event during which impacting forces are applied to the outer door panel 26.

Third, the inclusion of the vibration absorbing member 36 reduces the potential for deformation of structures within the rear door 16 in response to a side impact event. First, the vibration absorbing member 36 is fixed to both the door handle assembly 18 and the first reinforcement member 28. Impacting forces acting on the outer door panel 26 can be transmitted through the metallic reinforcement bracket 82 through the vibration absorbing member 36 to the first reinforcement member 28. Further, if the impacting forces acting on the outer door panel 26 are sufficient to provide deformation that causes the door handle assembly 18 to move inboard toward the inner door panel 24, impacting forces are transmitted through the vibration absorbing member 36 causing it to move toward and into contact with the concealed portion 54b of the window track 54. Consequently, a portion of the impacting forces are transmitted to the window track 54, as well as the first reinforcement member 28.

It should be understood from the drawings and the description herein that the above structures can also be utilized in the front door 14.

Second Embodiment

Figure 38:
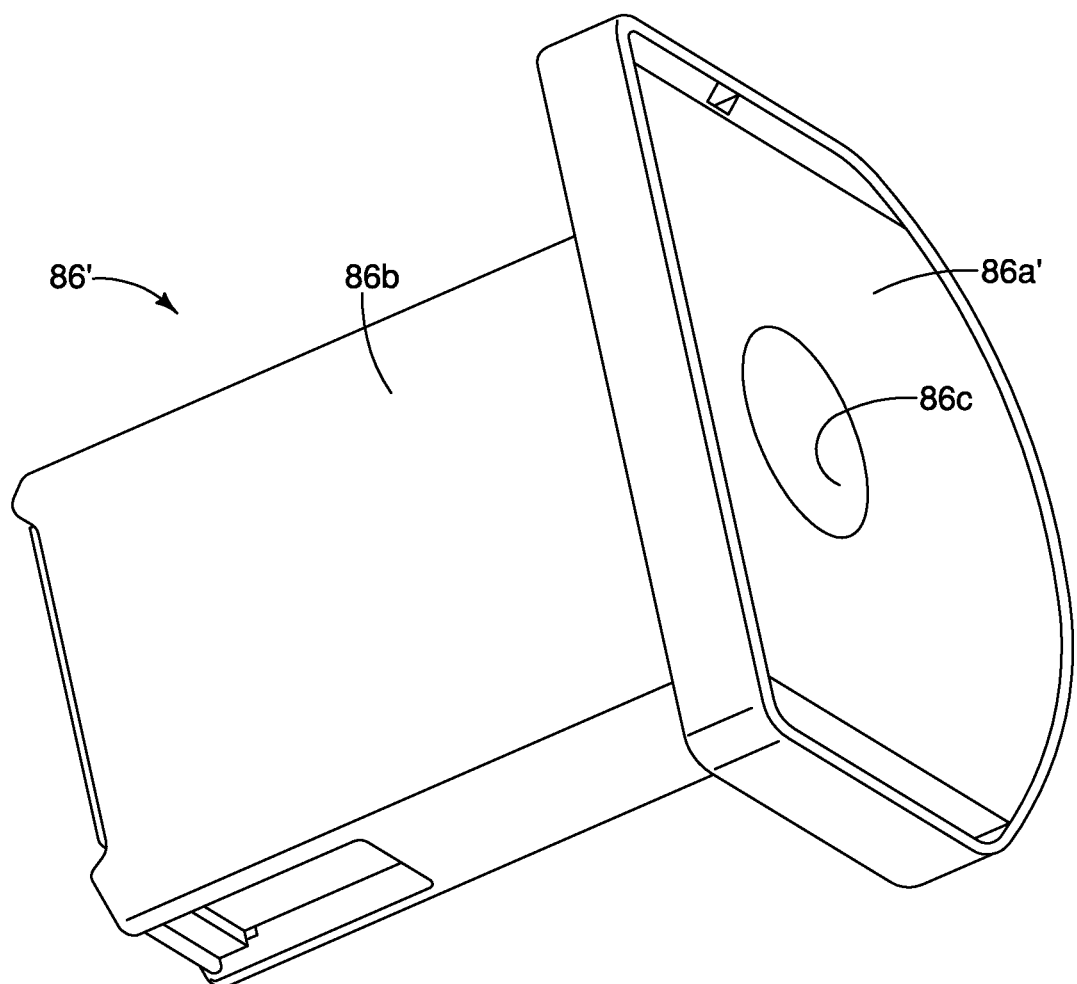
FIG. 38 is a perspective view of a first fastener showing a head portion and a shank portion in accordance with a second embodiment.
Figures 39, 40:
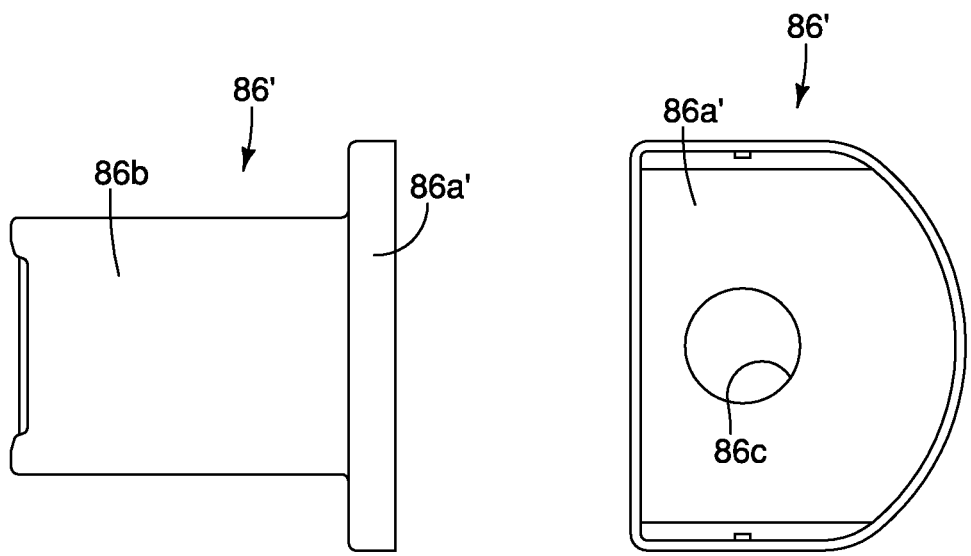
FIG. 39 is a side view of the first fastener showing the shank portion and the head portion in accordance with the second embodiment.
FIG. 40 is an end view of the first fastener showing the head portion in accordance with the second embodiment.

Referring now to FIGS. 38-40, a first fastener 86' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The first fastener 86' has a head 86a' and the rectangular shaped shank 86b. The rectangular shaped shank 86b is as described above in the first embodiment.

The head 86a' of the first fastener 86 has the opening 86c that extends through the shank 86b. The head 86a' does not have a rectangular shape. One edge of the head 86a' is straight while the opposite edge has a semi-circular shape, thereby increasing the contact area between the head 86a' and the outboard surface 76 of the outer door panel 26.

The various vehicle features and components (other than the rear door 16 described above) are conventional features and components that are well known in the art. Since vehicle features and components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle door structure. Accordingly, these terms, as utilized to describe the present invention should be interpreted relative to a vehicle equipped with the vehicle door structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle door assembly, comprising:
an outer door panel having an inboard surface and an outboard surface with a first handle opening that extends from the inboard surface to the outboard surface;
an inner door panel having an outer periphery fixed to a corresponding outer periphery of the outer door panel defining a cavity therebetween;
a door handle assembly fixedly attached to the outer door panel, with at least a portion of the door handle assembly overlaying the inboard surface of the outer door panel within the cavity, an inboard portion of the door handle assembly having a connection structure;
an upwardly extending bracket within the cavity, the upwardly extending bracket being inclined by an angle that is between 10 and 30 degrees relative to a vertical direction perpendicular to a horizontally oriented vehicle that includes at least the outer door panel, the inner door panel and the upwardly extending bracket installed thereto, an upper end of the upwardly extending bracket being fixed to an upper end of at least one of the inner door panel or the outer door panel and a lower end of the upwardly extending bracket being fixed to a lower end of at least one of the inner door panel or the outer door panel, the upwardly extending bracket being spaced apart from the door handle assembly;
a window supporting mechanism installed within the cavity between the inner door panel and the outer door panel, the window supporting mechanism includes a window track that supports a glass window during upward and downward movement of the glass window; and
a vibration absorbing member having a first end fixed to the connection structure of the door handle assembly and a second end attached to the upwardly extending bracket at a location spaced apart from the upper and lower ends of the upwardly extending bracket, with a central portion of the vibration absorbing member being outboard of and overlaying a section of the window track.

2. The vehicle door assembly according to claim 1, wherein the vibration absorbing member is at least partially made of a foam material.

3. The vehicle door assembly according to claim 1, wherein
the outer door panel and the inner door panel at least partially define a rear door that has window opening, a bottom edge and an inclined edge that extends upward and rearward from the bottom edge toward a rearward end of the window opening, the bottom edge and the inclined edge defining an obtuse angle measured therebetween, the obtuse angle being between an angle that is between 110 and 140 degrees.

4. The vehicle door assembly according to claim 3, wherein
the upwardly extending bracket has a lower attachment flange and an upper attachment flange, the lower attachment flange being fixedly to the at least one of the inner door panel or the outer door panel along a lower area of the inclined edge, and, the upper attachment flange being fixedly to the at least one of the inner door panel or the outer door panel proximate a central area of the window opening.

5. A vehicle door assembly, comprising:
an outer door panel having an inboard surface and an outboard surface with a first handle opening that extends from the inboard surface to the outboard surface;
an inner door panel having an outer periphery fixed to a corresponding outer periphery of the outer door panel defining a cavity therebetween;
a door handle assembly fixedly attached to the outer door panel, with at least a portion of the door handle assembly overlaying the inboard surface of the outer door panel within the cavity, an inboard portion of the door handle assembly having a connection structure;
an upwardly extending bracket within the cavity, the upwardly extending bracket being inclined by an angle that is between 10 and 30 degrees relative to a vertical direction perpendicular to a horizontally oriented vehicle that includes at least the outer door panel, the inner door panel and the upwardly extending bracket installed thereto, an upper end of the upwardly extending bracket being fixed to an upper end of at least one of the inner door panel or the outer door panel and a lower end of the upwardly extending bracket being fixed to a lower end of at least one of the inner door panel or the outer door panel, the upwardly extending bracket being spaced apart from the door handle assembly; and
a vibration absorbing member having a first end fixed to the connection structure of the door handle assembly and a second end attached to the upwardly extending bracket at a location spaced apart from the upper and lower ends of the upwardly extending bracket,
the door handle assembly including a clip structure that attaches to the first end of the vibration absorbing member, with the second end of the vibration absorbing member being attached to the upwardly extending bracket via a mechanical fastener, and the door handle assembly includes a handle base bracket and a metallic reinforcement bracket, the handle base bracket having an outboard surface that contacts and overlays the portion of the inboard surface of the outer door panel, the metallic reinforcement bracket having a main section fixedly attached to the inboard surface of the handle base bracket, the main section also includes the clip structure.

6. The vehicle door assembly according to claim 5, wherein
the handle base bracket is mechanically fastened to the outer door panel proximate a pivot axis of an operation handle of the door handle assembly.

7. The vehicle door assembly according to claim 5, wherein
the metallic reinforcement bracket includes a first side flange and a second side flange that extend from opposite sides of the main section, the first side flange and the second side flange being parallel to one another and perpendicular to the main section.

8. The vehicle door assembly according to claim 7, wherein
distal edges of each of the first side flange and the second side flange of the metallic reinforcement bracket define a gap relative to corresponding portions of the inboard surface of the door panel.

9. A vehicle door assembly, comprising:
an outer door panel having an inboard surface and an outboard surface with a first handle opening that extends from the inboard surface to the outboard surface;
an inner door panel having an outer periphery fixed to a corresponding outer periphery of the outer door panel defining a cavity therebetween;
a door handle assembly fixedly attached to the outer door panel, with at least a portion of the door handle assembly overlaying the inboard surface of the outer door panel within the cavity, an inboard portion of the door handle assembly having a connection structure;
an upwardly extending bracket within the cavity, the upwardly extending bracket being fixed to an upper end and a lower end of at least one of the inner door panel or the outer door panel, the upwardly extending bracket being spaced apart from the door handle assembly; and
a vibration absorbing member having a first end fixed to the connection structure of the door handle assembly and a second end attached to the upwardly extending bracket at a location spaced apart from upper and lower ends of the upwardly extending bracket;
a window supporting mechanism installed within the cavity, the window supporting mechanism includes a window track that supports a glass window during upward and downward movement of the glass window, with a central portion of the vibration absorbing member overlaying a section of the window track.

10. The vehicle door assembly according to claim 9, wherein
the vibration absorbing member is at least partially made of a foam material.

11. The vehicle door assembly according to claim 9, wherein
the door handle assembly includes a clip structure that attaches to the first end of the vibration absorbing member, with the second end of the vibration absorbing member being attached to the upwardly extending bracket via a mechanical fastener.

12. The vehicle door assembly according to claim 9, wherein
the outer door panel and the inner door panel at least partially define a rear door that has window opening, a bottom edge and an inclined edge that extends upward and rearward from the bottom edge toward a rearward end of the window opening, the bottom edge and the inclined edge defining an obtuse angle measured therebetween, the obtuse angle being between an angle that is between 110 and 140 degrees.

13. The vehicle door assembly according to claim 12, wherein
the upwardly extending bracket has a lower attachment flange and an upper attachment flange, the lower attachment flange being fixedly to the at least one of the inner door panel or the outer door panel along a lower area of the inclined edge, and, the upper attachment flange being fixedly to the at least one of the inner door panel or the outer door panel proximate a central area of the window opening.

14. The vehicle door assembly according to claim 9, wherein
the door handle assembly includes a handle base bracket and a metallic reinforcement bracket, the handle base bracket having an outboard surface that contacts and overlays the portion of the inboard surface of the outer door panel, the metallic reinforcement bracket having a main section fixedly attached to the inboard surface of the handle base bracket, the main section also includes a clip structure that attaches to the vibration absorbing member.

15. The vehicle door assembly according to claim 14, wherein
the handle base bracket is mechanically fastened to the outer door panel proximate a pivot axis of an operation handle of the door handle assembly.

16. The vehicle door assembly according to claim 15, wherein
the metallic reinforcement bracket includes a first side flange and a second side flange that extend from opposite sides of the main section, the first side flange and the second side flange being parallel to one another and perpendicular to the main section.

17. The vehicle door assembly according to claim 15, wherein
at least a portion of distal edges of each of the first side flange and the second side flange of the metallic reinforcement bracket define a gap relative to corresponding portions of the inboard surface of the door panel.

* * * * *